US010871426B2

(12) United States Patent
Berezhna et al.

(10) Patent No.: US 10,871,426 B2
(45) Date of Patent: Dec. 22, 2020

(54) ASSESSMENT AND CONTROL OF REAGENTS IN AUTOMATED SLIDE PREPARATION

(71) Applicant: Abbott Laboratories, Abbott Park, IL (US)

(72) Inventors: Svitlana Y. Berezhna, Los Gatos, CA (US); Mahmoud Janbakhsh, San Ramon, CA (US); Ema C. Olah, Ventura, CA (US); Robert Langsner, Abbott Park, IL (US)

(73) Assignee: Abbott Laboratories, Abbott park, IL (US)

( * ) Notice: Subject to any disclaimer, the term of this patent is extended or adjusted under 35 U.S.C. 154(b) by 173 days.

(21) Appl. No.: 15/792,460

(22) Filed: Oct. 24, 2017

(65) Prior Publication Data

US 2018/0143111 A1 May 24, 2018

Related U.S. Application Data

(60) Provisional application No. 62/412,529, filed on Oct. 25, 2016.

(51) Int. Cl.
*G01N 1/30* (2006.01)
*G06K 9/62* (2006.01)
(Continued)

(52) U.S. Cl.
CPC ......... *G01N 1/30* (2013.01); *G01N 35/00663* (2013.01); *G06K 9/00147* (2013.01);
(Continued)

(58) Field of Classification Search
None
See application file for complete search history.

(56) References Cited

U.S. PATENT DOCUMENTS 4,014,010 A 3/1977 Jinotti
5,743,135 A 4/1998 Sayka et al.
(Continued)

FOREIGN PATENT DOCUMENTS

CN 101530638 A 9/2009
CN 204128643 1/2015
(Continued)

OTHER PUBLICATIONS

Foubister (2001) "Sidestepping common deficiencies" www.captodayonline.com/archives, pp. 1-5.
(Continued)

*Primary Examiner* — Bernard Krasnic
(74) *Attorney, Agent, or Firm* — Edward J. Baba; Bozicevic, Field & Francis LLP

(57) ABSTRACT

The present disclosure provides methods for the automated control of aspects of slide preparation in an automated slide preparation instrument. Aspects of the methods include automated assessments of reagent amounts, quality and performance as well as automated adjustments of reagents based on such assessments, including the adjustment of reagent amounts, e.g., as present in reagent baths, the adjustment of reagent compositions and the replacement of reagents. Devices and systems useful in performing the described methods are also provided herein.

33 Claims, 10 Drawing Sheets

(51) Int. Cl.
G06K 9/00 (2006.01)
G01N 35/00 (2006.01)
G06T 7/00 (2017.01)
G06T 7/90 (2017.01)
G01N 1/31 (2006.01)
G01F 23/68 (2006.01)
G01F 25/00 (2006.01)
G01F 23/70 (2006.01)

(52) U.S. Cl.
CPC ......... G06K 9/6202 (2013.01); G06K 9/6212 (2013.01); G06T 7/0014 (2013.01); G06T 7/90 (2017.01); *G01F 23/68* (2013.01); *G01F 23/706* (2013.01); *G01F 25/0061* (2013.01); *G01N 1/312* (2013.01); *G01N 2001/302* (2013.01); *G01N 2001/315* (2013.01); *G01N 2035/00673* (2013.01); *G06K 2209/05* (2013.01); *G06T 2207/10024* (2013.01); *G06T 2207/10056* (2013.01); *G06T 2207/30024* (2013.01)

(56) References Cited

U.S. PATENT DOCUMENTS

| | | | |
|---|---|---|---|
| 6,333,512 B1 | 12/2001 | Wirthlin | |
| 6,387,326 B1 | 5/2002 | Edwards et al. | |
| 7,259,384 B2 | 8/2007 | Hariram et al. | |
| 2003/0194122 A1 | 10/2003 | Stone et al. | |
| 2006/0169039 A1 | 8/2006 | Zalenski et al. | |
| 2006/0237670 A1 | 10/2006 | Hariram et al. | |
| 2006/0288777 A1 | 12/2006 | Lazaris | |
| 2017/0178361 A1 | 6/2017 | Berezhna et al. | |
| 2018/0121709 A1* | 5/2018 | Garsha | G06K 9/38 |

FOREIGN PATENT DOCUMENTS

| | | | |
|---|---|---|---|
| WO | 2015135550 | 9/2015 | |
| WO | WO-2016189065 A1 * | 12/2016 | G01N 1/30 |

OTHER PUBLICATIONS

Horobin and Walter (1987) "Understanding Romanowsky staining" Histochemistry 86: 331-336.

Marshall et al. (1975) "A standardized Romanowsky stain prepared from purified dyes." J Clin Pathol 28(11): 920-923.

Marshall et al. (1975) "An evaluation of some commercial Romanowsky stains" J Clin Pathol 28(8): 680-685.

Marshall et al. (1978) "Staining properties and stability of a standardised Romanowsky stain" J Clin Pathol 31(3): 280-282.

Marty (2007) "Blank-field correction for achieving a uniform white background in brightfield digital photomicrographs" BioTechniques 42: 716-720.

Platt et al. (2009) "Tissue Floaters and Contaminants in the Histology Laboratory" Arch Pathol Lab Med 133: 973-978.

* cited by examiner

FIG. 3
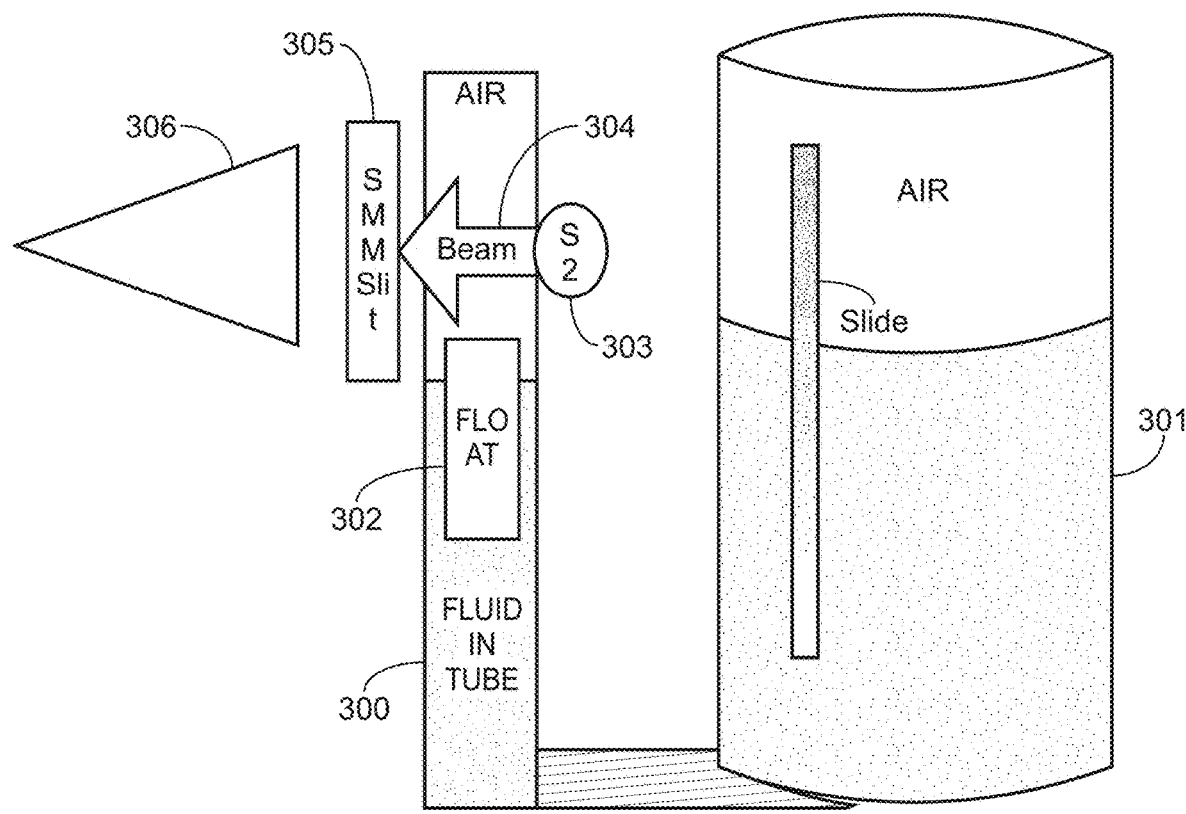
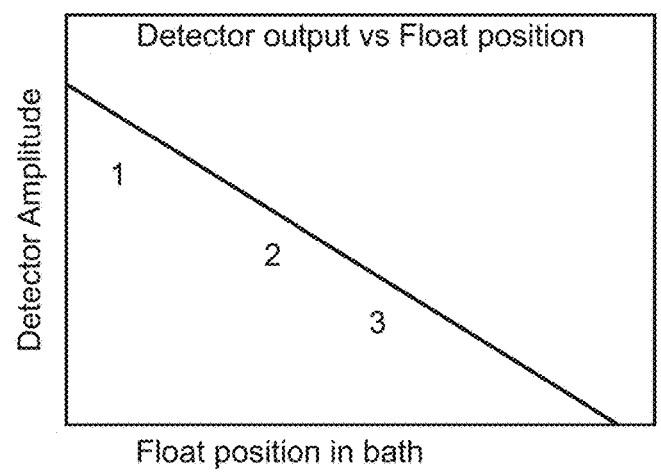
FIG. 4

ASSESSMENT AND CONTROL OF REAGENTS IN AUTOMATED SLIDE PREPARATION

CROSS-REFERENCE TO RELATED APPLICATIONS

This application claims the benefit of U.S. Provisional Patent Application No. 62/412,529 filed Oct. 25, 2016, which application is incorporated herein by reference in its entirety.

BACKGROUND

Histological and hematological analysis of patient specimens on prepared slides remains a cornerstone of clinical medicine. Such processes, including specimen preparation as well as analysis, are becoming increasingly automated. Automated histology and hematology increase specimen throughput while decreasing the incidence of observer bias and the influence of human subjectivity on the preparation and analysis processes.

Automated histology and hematology slide preparation systems have been developed to handle all steps of the slide preparation procedure from the application of the specimen to the slide, through specimen staining, and even imaging and analysis. The increased throughput of such devices as well as the immense complexity of automating the entire process places stringent demands on the reagents used. Producing consistent results in an automated histology and/or hematology analyzer requires fine control over the many reagents utilized in the various steps including fixation, staining, washing, etc., to assure optimal staining and proper functioning of automated analysis algorithms. Furthermore, rapid detection of drops in reagent quality or incorrectly filled reagent baths can limit or prevent the preparation of slides that are insufficient for analysis thus reducing the need to retest samples.

SUMMARY

The present disclosure provides methods for the automated control of aspects of slide preparation in an automated slide preparation instrument. Aspects of the methods include automated assessments of reagent amounts, quality and performance as well as automated adjustments of reagents based on such assessments, including the adjustment of reagent amounts, e.g., as present in reagent baths, the adjustment of reagent compositions and the replacement of reagents. Devices and systems useful in performing the described methods are also provided herein.

Aspects of the present disclosure include a method of assessing the volume of liquid present in a bath, the method comprising: emitting a signal along a signal path to a detector: positioning in the signal path a float within a vertical level tube, the vertical level tube having one end connected to a bath containing a volume of liquid; raising or lowering the volume of liquid to raise or lower the float to at least partially block the signal from reaching the detector; detecting the at least partially blocked signal; assessing the volume of liquid present in the bath based on the detected partially blocked signal.

In some embodiments, the signal is an optical signal, the signal path is an optical path and the detector is an optical detector. In some embodiments, the signal is an acoustic signal, the signal path is an acoustic path and the detector is an acoustic detector. In some embodiments, the vertical level tube comprises an aperture though which the signal path passes. In some embodiments, the aperture is a vertical slit. In some embodiments, the assessing comprises measuring an amplitude of the at least partially blocked signal, wherein the amplitude is linearly correlated with the volume of liquid present in the bath. In some embodiments, the method further comprises reporting the result of the assessment. In some embodiments, the bath is a reagent bath and the volume of liquid comprises a slide preparation reagent. In some embodiments, the slide preparation reagent is a fixative. In some embodiments, the slide preparation reagent is a histological stain. In some embodiments, the slide preparation reagent is a wash solution.

Aspects of the present disclosure include an automated method of determining the number of slides held by a slide carrier, the method comprising: positioning one or more slides held by a slide carrier in a signal path formed between an emitter and a detector; measuring a signal detected by the detector when the one or more slides are in the signal path; determining the number of slides held by the slide carrier based on the measuring.

In some embodiments, the determining comprises comparing the measured signal to a reference value. In some embodiments, the reference value is based on the amplitude of the signal emitted by the emitter. In some embodiments, the reference value is a predetermined percent transmission value. In some embodiments, the measuring comprises calculating the percent of the signal emitted by the emitter transmitted to the detector. In some embodiments, the path passes through a bath. In some embodiments, the path passes through a route to or from a bath taken by the one or more slides held by the slide carrier. In some embodiments, the one or more slides held by the slide carrier comprises two or more slides. In some embodiments, the method further comprises adjusting a volume of liquid present in a bath based on the determined number of slides held by the slide carrier. In some embodiments, the adjusting comprises increasing the volume of liquid present in the bath. In some embodiments, the adjusting comprises decreasing the volume of liquid present in the bath. In some embodiments, adjusting the volume of liquid comprises raising or lowering the level of liquid present in the bath by between 0.1 mm to 10 mm. In some embodiments, adjusting the volume of liquid comprises raising or lowering the level of liquid present in the bath by between 0.5 mm to 5 mm. In some embodiments, the bath is a reagent bath and the volume of liquid comprises a slide preparation reagent. In some embodiments, the slide preparation reagent is a fixative. In some embodiments, the slide preparation reagent is a histological stain. In some embodiments, the slide preparation reagent is a wash solution.

Aspects of the present disclosure include an automated method of adjusting the volume of liquid present in a reagent bath, the method comprising: assessing the volume of liquid present in a reagent bath; determining the number of slides held by a slide carrier; calculating a predicted liquid level for the reagent bath expected when the determined number of slides are inserted into the reagent bath from the assessed volume of liquid and the determined number of slides; comparing the predicted liquid level to a predetermined liquid level for the reagent bath to identify an adjustment amount; and adjusting the volume of liquid present in the reagent bath according to the adjustment amount.

In some embodiments, the adjusting comprises increasing the volume of liquid present in the reagent bath. In some embodiments, the adjusting comprises decreasing the volume of liquid present in the reagent bath. In some embodiments, the determining the number of slides held by the slide carrier is performed while the one or more slides are en route to the reagent bath. In some embodiments, the determining the number of slides held by the slide carrier is performed when the one or more slides are inserted into a primary bath separate from the reagent bath. In some embodiments, the primary bath is a fixation bath. In some embodiments, the primary bath is a wash bath. In some embodiments, the reagent bath is a staining bath. In some embodiments, the primary bath and the reagent bath are both staining baths.

Aspects of the present disclosure include a bath volume indicator comprising: an emitter; a detector positioned opposite the emitter forming an signal path; and a vertical level tube, having one end connected to a bath, and comprising a float positioned between the emitter and the detector in the signal path, wherein the float, when raised or lowered by the volume of liquid within the bath, at least partially blocks a signal emitted along the path from reaching the detector.

In some embodiments, the signal is an optical signal, the signal path is an optical path and the detector is an optical detector. In some embodiments, the signal is an acoustic signal, the signal path is an acoustic path and the detector is an acoustic detector. In some embodiments, the vertical level tube comprises an aperture, wherein the float, when raised or lowered by the volume of liquid within the bath, at least partially blocks the signal emitted along the signal path from passing through the aperture and reaching the detector. In some embodiments, the aperture is a vertical slit. In some embodiments, the volume indicator further comprises a processor in communication with the detector for measuring the amplitude of the signal received by the detector and outputting the volume of liquid within the bath. In some embodiments, the bath is a staining bath. In some embodiments, the bath is a fixation bath. In some embodiments, the bath is a wash bath.

Aspects of the present disclosure include an automated slide counting system comprising: a slide carrier comprising a plurality of slots each dimensioned for holding a slide; an emitter-detector pair comprising a signal path that is broken by slides held in the slide carrier; a processor in communication with the detector of the emitter-detector pair having instructions, that when executed, cause the processor to: measure the amplitude of a signal received by the detector when the signal path is broken by the slides; and determine the number of slides held by the slide carrier based on the measuring.

Aspects of the present disclosure include a volume controlled slide staining system comprising: an automated slide counting system; and a reagent bath comprising a bath volume indicator; and a valve, wherein the processor of the automated slide counting system further comprises instructions, that when executed, cause the processor to trigger the valve to adjust the volume of liquid present in the reagent bath based on the determined number of slides held by the slide carrier.

In some embodiments, the reagent bath is a staining bath. In some embodiments, the system further comprises a computer memory in communication with the processor that comprises a library of volume adjustments that correspond to the determined number of slides held by the slide carrier. In some embodiments, the valve is triggered to increase the volume of liquid present in the reagent bath. In some embodiments, the valve is triggered to decrease the volume of liquid present in the reagent bath. In some embodiments, the signal path that is broken by slides held in the slide carrier passes through a path taken by the slides during transport to the reagent bath. In some embodiments, the system further comprises a primary bath from which the slide carrier transports the slides to the reagent bath. In some embodiments, the signal path that is broken by slides held in the slide carrier passes through the primary bath. In some embodiments, the primary bath is a fixation bath. In some embodiments, the primary bath is a wash bath. In some embodiments, the primary bath and the reagent bath are both staining baths.

Aspects of the present disclosure include a method of assessing a stain; the method comprising: simultaneously staining a plurality of slides in the stain wherein the plurality comprises at least one specimen slide and a blank slide; acquiring a digital color image of the stained blank slide using a specimen slide imaging device; processing the digital color image to produce a background stain signature comprising at least one staining parameter value; and comparing the background stain signature to a reference signature to assess the stain.

In some embodiments, the at least one staining parameter value comprises an overall staining intensity value. In some embodiments, the processing comprises separating the digital color image into individual color channels. In some embodiments, the at least one staining parameter value comprises a red staining intensity value. In some embodiments, the at least one staining parameter value comprises a green staining intensity value. In some embodiments, the at least one staining parameter value comprises a blue staining intensity value. In some embodiments, the acquiring comprises acquiring a plurality of digital color images of different areas of the stained blank slide and the processing comprises processing the plurality of digital color images to produce a background stain signature comprising at least one stain parameter value for each image of the plurality. In some embodiments, the at least one stain parameter value for each image of the plurality comprises an overall staining intensity value. In some embodiments, the staining parameter value comprises an overall staining uniformity value. In some embodiments, the processing comprises separating each image of the plurality into individual color channels. In some embodiments, the at least one staining parameter value for each image of the plurality comprises a red staining intensity value. In some embodiments, the staining parameter value comprises a red staining uniformity value. In some embodiments, the at least one staining parameter value for each image of the plurality comprises a green staining intensity value. In some embodiments, the staining parameter value comprises a green staining uniformity value. In some embodiments, the at least one staining parameter value for each image of the plurality comprises a blue staining intensity value. In some embodiments, the staining parameter value comprises a blue staining uniformity value. In some embodiments, the different areas of the stained blank slide are adjacent areas. In some embodiments, the different areas of the stained blank slide are nonadjacent areas. In some embodiments, the different areas of the stained blank slide are in a path along the middle of the slide. In some embodiments, the stained blank slide comprises a long axis and a short axis. In some embodiments, the different areas of the stained blank slide are in a path along the long axis of the slide. In some embodiments, the different areas of the stained blank slide are in a path along the short axis of the slide. In some embodiments, the different areas of the stained blank slide comprise a path along the short axis and a path along the long axis. In some embodiments, the reference signature is based on a digital image of an unstained slide acquired using the specimen slide imaging device. In some embodiments, the reference signature is based on a digital image, acquired using the specimen slide imaging device, of a blank slide stained with a stain of known quality. In some embodiments, the method assesses the quality of the stain. In some embodiments, the method further comprises outputting a result as to whether the stain quality is above a predetermined threshold. In some embodiments, the method assesses the presence of debris in the stain. In some embodiments, the method assesses whether the stain produces streaks.

Aspects of the present disclosure include a method of controlling stain quality, the method comprising: assessing the quality of a stain; outputting a result as to whether the stain quality is above a predetermined threshold; and triggering an adjustment of the stain based on the result.

In some embodiments, the adjustment comprises increasing the amount of the stain present in a staining bath. In some embodiments, the adjustment comprises supplementing the stain with one or more components of the stain. In some embodiments, the adjustment comprises emptying the stain bath and replacing the stain. In some embodiments, the emptying and replacing further comprises washing the stain bath.

Aspects of the present disclosure include a system for assessing a stain, the system comprising: a specimen slide imaging device; a computer memory storing a reference signature; a processor in communication with the specimen slide imaging device and the computer memory, the processor having instructions that, when executed, cause the processor to: receive from the specimen slide imaging device a digital color image of a stained blank slide; process the digital color image to produce a background stain signature comprising at least one staining parameter value; retrieve the reference signature from the computer memory; and compare the background stain signature to the reference signature to assess the stain.

In some embodiments, the system further comprises a user interface in communication with the processor that outputs the result of the assessment. In some embodiments, the at least one staining parameter value comprises an overall staining intensity value. In some embodiments, the processor further includes instructions that, when executed, cause the processor to separate the digital color image into individual color channels. In some embodiments, the at least one staining parameter value comprises a red staining intensity value. In some embodiments, the at least one staining parameter value comprises a green staining intensity value. In some embodiments, the at least one staining parameter value comprises a blue staining intensity value. In some embodiments, the processor further includes instructions that, when executed, cause the specimen slide imaging device to acquire a plurality of digital color images of different areas of the stained blank slide. In some embodiments, the processor further includes instructions that, when executed, cause the processor to process the plurality of digital color images to produce a background stain signature comprising at least one stain parameter value for each image of the plurality. In some embodiments, the at least one stain parameter value for each image of the plurality comprises an overall staining intensity value. In some embodiments, the staining parameter value comprises an overall staining uniformity value. In some embodiments, the processor further includes instructions that, when executed, cause the processor to separate each digital color image of the plurality into individual color channels. In some embodiments, the at least one staining parameter value for each image of the plurality comprises a red staining intensity value. In some embodiments, the staining parameter value comprises a red staining uniformity value. In some embodiments, the at least one staining parameter value for each image of the plurality comprises a green staining intensity value. In some embodiments, the staining parameter value comprises a green staining uniformity value. In some embodiments, the at least one staining parameter value for each image of the plurality comprises a blue staining intensity value In some embodiments, the staining parameter value comprises a blue staining uniformity value. In some embodiments, the reference signature is based on a digital image of an unstained slide acquired using the specimen slide imaging device. In some embodiments, the reference signature is based on a digital image, acquired using the specimen slide imaging device, of a blank slide stained with a stain of known quality. In some embodiments, the processor further includes instructions that, when executed, cause the processor to compare the result of the assessment to a predetermined stain quality threshold stored in the computer memory and output a result as to whether the stain quality is above the predetermined stain quality threshold.

Aspects of the present disclosure include a system for controlling stain quality, the system comprising: a system for assessing a stain; a staining bath comprising the stain; one or more valves in communication with the processor, wherein the processor further includes instructions that, when executed, trigger the one or more valves to adjust the stain based on the assessment.

In some embodiments, the one or more valves comprise a fill valve, connected to a reservoir comprising stain, that when triggered increases the amount of stain present in the staining bath. In some embodiments, the one or more valves comprise a fill valve, connected to a reservoir comprising a component of the stain, that when triggered adds the component of the stain to the staining bath. In some embodiments, the one or more valves comprise a fill valve, connected to a reservoir comprising a wash fluid, that when triggered adds the wash fluid to the staining bath. In some embodiments, the one or more valves comprise a drain valve connected to the staining bath that when triggered decreases the amount of stain present in the staining bath.

BRIEF DESCRIPTION OF THE FIGURES

FIG. 3 depicts a schematic of a level tube based automated volume indicator system according to one embodiment of the present disclosure.

FIG. 4 demonstrates the linear correlation between detector amplitude output and float position in a level tube-based automated volume indicator system according to one embodiment of the present disclosure.

DEFINITIONS

Figure 1:
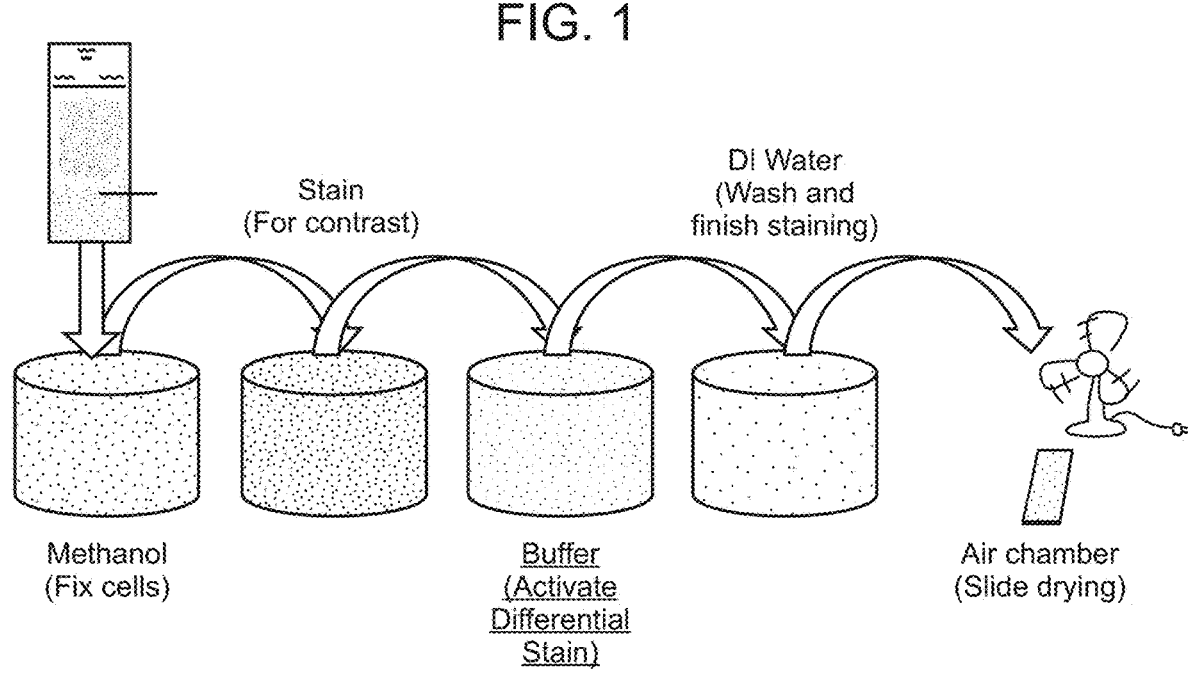
FIG. 1 depicts a schematic of a process of histological slide preparation according to one embodiment of the methods described herein.

The term "assessing" includes any form of measurement, and includes determining if an element is present or not. The terms "determining", "measuring", "evaluating", "assessing" and "assaying" are used interchangeably and include quantitative and qualitative determinations. Assessing may be relative or absolute. "Assessing the identity of" includes determining the most likely identity of a particular compound or formulation or substance, and/or determining whether a predicted compound or formulation or substance is present or absent. "Assessing the quality of" includes making a qualitative or quantitative assessment of quality e.g., through the comparisons of a determined value to a reference or standard of known quality.

The term "histology" and "histological" as used herein generally refers to microscopic analysis of the cellular anatomy and/or morphology of cells obtained from a multicellular organism including but not limited to plants and animals. As such, a "histological stain" refers to a stain used in the analysis of cellular anatomy and/or morphology and a "histology analyzer" refers to an instrument that analyzes the anatomy and/or morphology of cells obtained from a multicellular animal. As used herein a histology analyzer will generally refer to an instrument that uses one or more histological stains to make a histological assessment. Histological analyzers may or may not also be used to prepare slides for histological analysis, including where such processes may or may not require manual input from a user during preparation (i.e., such devices may in some instances be automated).

The term "bodily fluid" as used herein generally refers to fluids derived from a "biological sample" which encompasses a variety of sample types obtained from an individual or a population of individuals and can be used in a diagnostic, monitoring or screening assay. The definition encompasses blood and other liquid samples of biological origin. The definition also includes samples that have been manipulated in any way after their procurement, such as by mixing or pooling of individual samples, treatment with reagents, solubilization, or enrichment for certain components, such as nucleated cells, non-nucleated cells, pathogens, etc.

The term "biological sample" encompasses a clinical sample, and also includes cells in culture, cell supernatants, cell lysates, serum, plasma, biological fluid, and tissue samples. The term "biological sample" includes urine, saliva, cerebrospinal fluid, interstitial fluid, ocular fluid, synovial fluid, blood fractions such as plasma and serum, and the like.

The terms "control", "control assay", "control sample" and the like, refer to a sample, test, or other portion of an experimental or diagnostic procedure or experimental design for which an expected result is known with high certainty, e.g., in order to indicate whether the results obtained from associated experimental samples are reliable, indicate to what degree of confidence associated experimental results indicate a true result, and/or to allow for the calibration of experimental results. For example, in some instances, a control may be a "negative control" assay such that an essential component of the assay is excluded such that an experimenter may have high certainty that the negative control assay will not produce a positive result. In some instances, a control may be "positive control" such that all components of a particular assay are characterized and known, when combined, to produce a particular result in the assay being performed such that an experimenter may have high certainty that the positive control assay will not produce a positive result. Controls may also include "blank" samples, "standard" samples (e.g., "gold standard" samples), validated samples, etc.

The term "inputting", as used herein, is used to refer to any way of entering information into a computer, such as, e.g., through the use of a user interface. For example, in certain cases, inputting can involve selecting a reference spectrum or a spectral characteristic or library thereof that is already present on a computer system. In other cases, inputting can involve adding a spectrum or a spectral characteristic to a computer system, e.g., by measuring the spectrum of a sample on a device capable of interfacing with a computer. Inputting can also be done using a user interface.

By "processor" or "data processing unit", as used herein, is meant any hardware and/or software combination that will perform the functions required of it. For example, any data processing unit herein may be a programmable digital microprocessor such as available in the form of an electronic controller, mainframe, server or personal computer (desktop or portable). Where the data processing unit is programmable, suitable programming can be communicated from a remote location to the data processing unit, or previously saved in a computer program product (such as a portable or fixed computer readable storage medium, whether magnetic, optical or solid state device based).

As used herein, the term "executing" is used to refer to an action that a user takes to initiate a program.

DETAILED DESCRIPTION

The present disclosure provides methods for the automated control of aspects of slide preparation in an automated slide preparation instrument. Aspects of the methods include automated assessments of reagent amounts, quality and performance as well as automated adjustments of reagents based on such assessments, including the adjustment of reagent amounts, e.g., as present in reagent baths, the adjustment of reagent compositions and the replacement of reagents. Devices and systems useful in performing the described methods are also provided herein.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods

As summarized above, the present disclosure provides methods for the automated assessment and control of aspects of slide preparation in an automated slide preparation instrument, including e.g., an automated slide smearing and staining instrument. Aspects of the methods include automated assessments of reagent amounts. Aspects of the methods also include, in some instances, assessments of reagent quality and/or performance. In some instances, the methods may include automated adjustments of reagents based on assessments, including e.g., where the amount of a reagent is adjusted based on an assessment, where the composition of a reagent is adjusted based on an assessment, where a reagent is replaced based on the result of an assessment, etc.

The methods of the present disclosure will generally be automated methods performed in the context of an automated slide preparation instrument that includes automated processes of smearing and/or staining a slide for analysis. Automated slide preparation instruments that may make use of the described methods will vary and may include e.g., automated histological slide preparation devices, automated hematology slide preparation devices, combination histological slide preparation and analysis devices, combination hematology slide preparation and analysis devices, and the like.

The methods of the instant disclosure may provide for automated control over various points of slide preparation processes. For example, in some instances, methods of the instant disclosure may include assessments of the amount of a reagent present in an apparatus for automated slide staining including e.g., a staining bath. Other assessments of the instant methods may include evaluating the performance of a particular reagent in an apparatus for automated slide staining including e.g., the performance of a slide stain in an automated slide staining method. As alluded to above, the instant methods may further include adjustments of reagents based on such assessments, including e.g., adjustments to the volume of a reagent present in a particular vessel within an apparatus for automated slide staining, adjustments to the composition of a particular reagent utilized within an apparatus for automated slide staining. As described in more detail below, such adjustments will vary greatly and may range from slight adjustments, e.g., to the volume of a reagent or a reagent composition, to large adjustments including e.g., replacement of a reagent.

An example of a typical slide preparation histological staining protocol is depicted in FIG. 1. Generally in histological staining protocols, a slide may be serially vertically inserted into a plurality of reagent baths. Such reagent baths may include one or more reagent baths for the fixation of cells/tissues adhered to the slide (e.g., as depicted in FIG. 1 as a "methanol" bath), one or more reagent baths for staining (e.g., as depicted in FIG. 1 as a "contrast" stain bath), one or more reagent baths for activation of a component of a stain (e.g., as depicted in FIG. 1 as a "buffer" bath to "activate differential stain"), one or more reagent baths for washing (e.g., as depicted in FIG. 1 as a "DI Water" bath using deionized water to wash and finish staining). In some instances, one or more slide preparation steps may be omitted and/or additional baths may be employed. Following preparation of the slide, a stained slide is typically dried prior to being imaged, where such drying processes may be performed passively (e.g., employing passive evaporation) or actively (e.g., employing convection by moving air over the slide). In some instances, slide preparation may further include additional steps, (e.g., upstream or downstream steps) including e.g., applying the specimen to the slide, smearing the specimen on the slide, contacting the slide with one or more specific binding members (e.g., an antibody, an oligonucleotide probe, etc.), labeling (e.g., labeling the specific binding member, if not pre-labeled), post-fixing, etc. Slide preparation methods may find use with a variety of specimens including but not limited to e.g., those derived from a biological sample, a bodily fluid, etc.

As noted above, the methods of the present disclosure may find use in assessing and controlling reagents utilized in slide preparation protocols include histological staining protocols utilizing one or more reagent bath incubation steps. The subject methods find use, at least in part, in assessing the amount of reagent present in a reagent bath, determining that adjustment of a reagent amount is necessary, identifying the type and magnitude of reagent adjustment necessary, assessing the quality of a reagent, and the like.

Assessing Reagent Amounts

In some instances, methods of the instant disclosure may include making an assessment of the amount of a reagent present in a particular vessel of an automated apparatus for slide preparation. For simplicity and clarity, methods for assessing reagent amounts will be described below in the context of staining of a histological or hematological slide for histological or hematological analysis; however, an ordinary skilled artisan will readily understand that the methods are not so limited and may find use in various other contexts where the assessment of a reagent amount present in a vessel, such as or similar to a staining bath, is desired.

In processes of histological or hematological staining, a sample or specimen, e.g., as collected from a subject, is first applied to the slide and the sample or specimen may cover a significant portion of, i.e., a majority of, the specimen area of the slide or may be spread or smeared to cover a significant portion of the specimen area of the slide. An example of a hematological smear present on a typical slide is schematized in FIG. 2. The slide depicted in FIG. 2 has a specimen information area (200) and a specimen area (201) that includes the smear (202). The specimen information area may include various details about the specimen including, e.g., identification of the patient from which the sample was derived, sample tracking information such as a barcode, assay information, etc. Exemplary dimensions of the smear (202), which an ordinary skilled artisan will understand may vary, are depicted. Also depicted is a desired liquid level (203) which represents the desired level of any reagent bath into which the slide may be vertically inserted for various purposes including e.g., fixation, staining, washing, de-staining, etc.

The present disclosure provides methods for maintaining a level of liquid in a reagent bath such that the entire specimen, or smear thereof, is immersed in the liquid but the specimen information area of the slide is not immersed in the liquid. Complete immersion of the specimen in the liquid of a reagent bath may allow for complete fixation of the entire specimen when the liquid contains a fixation reagent. Complete immersion of the specimen in the liquid of a reagent bath may allow for complete staining of the entire specimen when the liquid contains a staining reagent. Complete immersion of the specimen in the liquid of a reagent bath may allow for complete washing of the entire specimen when the liquid contains a wash reagent. Not immersing the specimen information area in the reagent bath may prevent obscuring of the information present in this area by one or more reagents present in the liquid of the reagent bath. For example, many organic solvents (e.g., ethanol, methanol, isopropanol, etc.) used in preparation of histological specimens readily dissolve common inks and/or adhesives and thus their contact with the specimen information area may be avoided.

Figure 2:
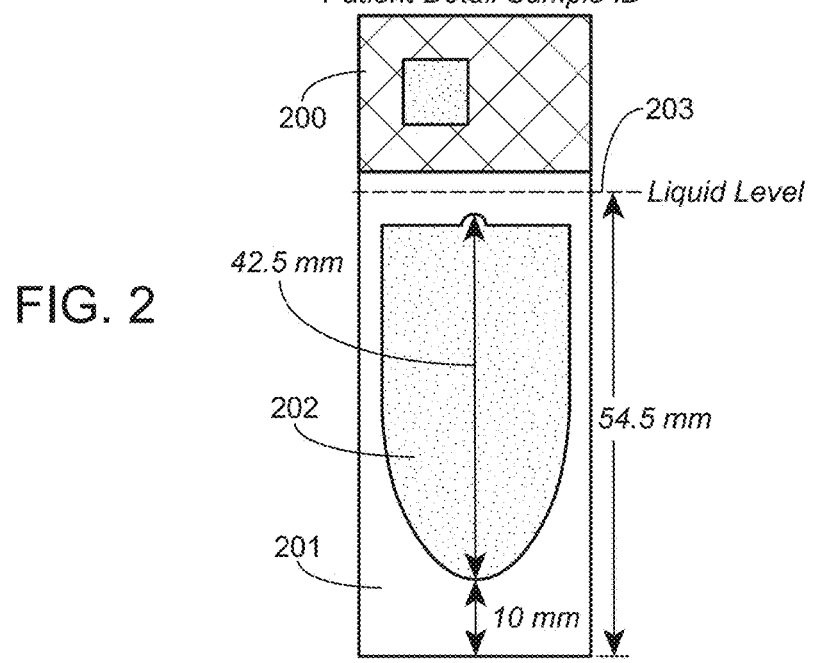
FIG. 2 depicts a schematic of a slide with a stained smear identifying various components of the slide and providing exemplary, but non-limiting, dimensions.

As can be seen in the schematic of FIG. 2, commonly employed specimen slides may provide for a relatively small margin of variation in the liquid level of a reagent bath where relatively small deviations outside of this margin of variation may cause the liquid to contact the specimen information area or to insufficiently cover the specimen. In some instances, the methods described herein may assess the liquid level of a bath such that the assessed liquid level is determined with an accuracy of ±5.0 mm or less, including but not limited to e.g., ±5.0 mm, ±4.5 mm or less, ±4.0 mm or less, ±3.5 mm or less, ±3.0 mm or less, ±2.5 mm or less, ±2.0 mm or less, ±1.5 mm or less, ±1.0 mm or less, ±0.5 mm or less, etc. The accuracy of a liquid level assessment may, in some instances, be based on the volume displacement of one or more slides. For example, the accuracy may be greater than or equal to the liquid level change associated with the displacement of one slide where, e.g., liquid level change associated with one slide may vary depending on the bath may be configuration. In some instances, the bath may be configured such that the liquid level change associated with one slide ranges from less than 0.1 mm to 5 mm or more including but not limited to e.g., 0.1 mm to 5 mm, 0.1 mm to 4 mm, 0.1 mm to 3 mm, 0.1 mm to 2 mm, 0.1 mm to 1 mm, 0.1 mm to 0.5 mm, 0.5 mm to 1 mm, 0.5 mm, etc.

In some instances, the methods described herein may control the liquid level of a bath such that the deviation of the liquid level from a predetermined or desired liquid level is not greater than about ±5.0 mm, including but not limited to e.g., not greater than ±5.0 mm, not greater than ±4.5 mm, not greater than ±4.0 mm, not greater than ±3.5 mm, not greater than ±3.0 mm, not greater than ±2.5 mm, not greater than ±2.0 mm, not greater than ±1.5 mm, not greater than ±1.0 mm, not greater than ±0.5 mm, etc.

As used herein, the term "reagent bath" generally refers to a liquid containing vessel that is used in any process of slide preparation including but not limited to e.g., the fixation, incubating, blocking, staining, hybridization, washing, de-staining, stripping, post-fixing, labeling, etc., that a slide may be subjected to in any staining protocol including e.g., histological staining protocols, hematological staining protocols, immunological staining protocols, DNA/RNA hybridization protocols, and the like. As such, reagent bath sizes and configurations will vary greatly.

The volume of liquid commonly employed in a reagent bath, also referred to as the "fill volume" or "operating volume", will similarly vary depending on the bath configuration and may range from less than 10 cc to 450 cc or more, including but not limited to e.g., from 10 cc to 450 cc, from 20 cc to 450 cc, from 30 cc to 450 cc, from 40 cc to 450 cc, from 50 cc to 450 cc, from 60 cc to 450 cc, from 70 cc to 450 cc, from 80 cc to 450 cc, from 90 cc to 450 cc, from 100 cc to 450 cc, from 110 cc to 450 cc, from 120 cc to 450 cc, from 130 cc to 450 cc, from 140 cc to 450 cc, from 150 cc to 450 cc, from 160 cc to 450 cc, from 170 cc to 450 cc, from 180 cc to 450 cc, from 190 cc to 450 cc, from 200 cc to 450 cc, from 210 cc to 450 cc, from 220 cc to 450 cc, from 230 cc to 450 cc, from 240 cc to 450 cc, from 250 cc to 450 cc, from 25 cc to 400 cc, from 25 cc to 350 cc, from 25 cc to 300 cc, from 25 cc to 250 cc, from 25 cc to 200 cc, from 25 cc to 150 cc, from 25 cc to 100 cc, from 25 cc to 50 cc, from 50 cc to 400 cc, from 50 cc to 350 cc, from 50 cc to 300 cc, from 50 cc to 250 cc, from 50 cc to 200 cc, from 50 cc to 150 cc, from 50 cc to 100 cc, from 10 cc to 200 cc, from 20 cc to 200 cc, from 30 cc to 200 cc, from 40 cc to 200 cc, from 50 cc to 200 cc, from 60 cc to 200 cc, from 70 cc to 200 cc, from 80 cc to 200 cc, from 90 cc to 200 cc, from 100 cc to 200 cc, from 110 cc to 200 cc, from 120 cc to 200 cc, from 130 cc to 200 cc, from 140 cc to 200 cc, from 150 cc to 200 cc, etc.

The liquid level in a reagent bath will be greatly dependent on the overall volume of the bath where, for instance, the liquid level of a bath with a large volume will vary less in response to various events (e.g., evaporation of liquid, insertion of one or more slides into the bath, addition/removal of a set volume of liquid to the bath, etc.) as compared to a bath with a small volume subjected to the same or an equivalent event. Non-limiting examples of overall volumes of bath that may be employed in the subject methods are provided below. Bath configurations will vary greatly any may take on essentially any shape compatible with the purposes it serves and in some instances may be essentially rectangular. In some instances, a bath may be configured or dimensioned to be compatible with a slide or a plurality of slides inserted into the bath.

Automated slide preparation devices may make use of automated methods that accurately assess and/or tightly control the liquid level in a reagent bath during automated slide preparation. Such devices include but are not limited to e.g., slide preparation devices associated with automated histology analyzers, devices that prepare slides for analysis in an automated histology analyzer, slide preparation devices associated with automated hematology analyzers, devices that prepare slides for analysis in an automated hematology analyzer, and the like.

Aspects of the present disclosure include assessments of reagent bath volume. By "assessments of reagent bath volume" is generally meant determining whether the volume of liquid present in a reagent bath is such that, when a slide or slides are present in the bath, the liquid level of the bath is at a desired or predetermined level or within a desired or predetermined range. Assessments of the present disclosure may or may not quantify the actual volume of liquid present in the bath and may in some instances, determine the relative volume of liquid present in the bath such that an assessment of the liquid level of the bath or an assessment of a change in the liquid level of the bath may be made. Assessments may be performed before or after slides are inserted or removed from a bath depending on the particular context and/or the configuration of sensors and detectors. In some instances, an assessment of reagent bath volume and/or liquid level is made and the assessment is further analyzed to determine if an adjustment is required, such adjustments being described in more detail below. In some instances, an assessment is made, and any necessary adjustment is performed, prior to a slide or slides being inserted into a bath such that when the slide(s) are inserted the liquid level of the bath reaches a predetermined or desired level.

In some instances, reagent bath volume may be assessed through the use of level tube connected to the bath. As used herein, by "level tube" is generally meant a measurement device that includes an open-ended tube configured to measure changes in liquid force resulting from changes in the fluid volume of the bath that are translated into changes in the liquid level within the level tube. In the present methods, a level tube will generally be connected to a reagent bath such that changes in the volume of liquid within the bath alter changes in the liquid level within the level tube. The level tube may be connected to any portion of the reagent bath and in any configuration such that an open end of the level tube is below the liquid level of the reagent bath and changes in the liquid volume result in measurable changes in liquid level within the level tube. The level tube may be connected to the bottom of the reagent bath, the side of the reagent bath, and the like. The level tube may or may not be connected with an intervening connector between the level tube and the bath such as, e.g., a tube or reservoir.

Aspects of the present methods, may include a float within or connected to the level tube that transfers changes in liquid level within the level tube into movement of the float. In some instances, the float may be inside the level tube. Any convenient material may be utilized for the float provided it is buoyant in the liquid or range of liquids utilized in the reagent bath. In some instances, the float may be made of a material that is resistant to one or more reagents utilized in the reagent bath, including e.g., alcohols such as but not limited to e.g., methanol, ethanol, etc. In some instances, the level tube and float may be configured and/or calibrated such that at a particular fluid volume of the bath the float is present at a level in or on the level tube to indicate a predetermined volume of liquid is present in the reagent bath. In some instances, the level tube, float and reagent bath may be configured and/or calibrated such that, at a particular fluid volume of the bath, the float is present at a level in or on the level tube to indicate that the liquid level of the bath is at a predetermined level. The level of the float may be determined in any convenient way including but not limited to e.g., visually or through the use of one or more detectors.

According to the automated embodiments described herein, in some instances the level of a float may be determined using a signal emitter and a signal detector, also referred to herein as an emitter-detector pair. In some instances, the emitter-detector pair utilized in detecting the level of a float may be an optical emitter-detector pair including e.g., an optical emitter and an optical detector. In some instances, the emitter-detector pair utilized in detecting the level of a float may be an acoustic emitter-detector pair including e.g., an acoustic emitter and an acoustic detector. Further herein, for simplicity emitter-detector pairs and corresponding signal paths will be described primarily in terms of optical emitter-detector pairs and optical paths. However, the present disclosure is not so limited as various other emitter detector pairs (e.g., acoustic detector pairs) may be readily configured for use and employed in the subject methods as appropriate. An ordinary skilled artisan will readily understand where, e.g., an acoustic emitter-detector pair (e.g., an acoustic emitter coupled with an appropriate acoustic detector) defining an acoustic path may be substituted for a described optical emitter-detector pair defining an optical path and such an artisan will further understand how the methods and devices may be reconfigured for such substitution.

In the present methods, the placement of an emitter and a detector opposite one another will generally define a signal path (e.g., an optical path, an acoustic path, etc.). However, a signal path may not be limited to the linear path between an emitter and its corresponding sensor/detector. For example, with regard to an optical path, various means of modifying an optical path may be employed including but not limited to e.g., mirrors, lenses, etc. Without the use of any means to redirect or divert an optical path, an optical path between an emitter and a detector opposite one another may be interrupted by one or more objects passing through or being inserted into the path between the emitter and detector. The interruption in the path may be complete, i.e., where no signal from the emitter reaches the detector due to the presence of the object in the path, or the interruption may be partial, i.e., where the object in the path only partially blocks the signal such that at least a portion of the signal from the emitter is still received by the detector.

The detector utilized in an emitter detector pair may be capable of integrating the degree to which a signal is partially interrupted allowing conversion of the received optical signal into an electrical signal that correlates with the degree of interruption. Signal interruption may vary, e.g., depending on whether the object placed in the optical path is opaque or semitransparent. For example, in some instances, signal interruption due to the presence of an opaque object may indicate the amount of the physical area of the signal that is blocked by the object, e.g., as is the case with a beam of light partially blocked by an opaque object. In some instances, signal interruption due to the presence of one or more semitransparent objects may be indicative of a property of the one or more semitransparent objects, including e.g., the thickness of the objects or the number of objects in the path, etc. As such partially blocked signals, as used to herein, may refer to signals where only a portion of the optical path is blocked by an opaque object, signals where the entire optical path is blocked by a semitransparent object, signals where only a portion of the optical path is blocked by a semitransparent object, and the like. Accordingly, detection of signal intensity or amplitude or transmittance may similarly refer to such partially blocked optical signals depending on the context.

In some instances, methods of the instant disclosure include positioning a level tube containing a float such that the float is within the optical path of an emitter-detector pair. Accordingly, changes in the volume of liquid present in the reagent bath to which the level tube is connected are translated to changes in the position of the float in the optical path. Changes in the position of the float in the optical path thus result in changes in the amount of optical signal blocked by the float. In some instances, the optical path may be positioned to pass through one or more apertures, e.g., either before or after, or both before and after, interaction with an interfering object such as a float. For example, in some instances, a signal produced from an emitter passes through a level tube containing a float and then through an aperture prior to reaching the detector. In some instances, a signal produced from an emitter passes through an aperture prior to passing through a level tube containing a float and then reaching the detector. In some instances, a signal produced from an emitter passes through a first aperture prior to passing through a level tube containing a float and then through a second aperture prior to reaching the detector. Apertures through which an optical path may pass can be on the level tube or can be separate from the level tube and on another component of the device. As such, apertures used in such methods may be arranged in various configurations. Useful apertures include those of defined shape and size including but not limited to e.g., slit apertures, circular apertures, and the like.

Turning now to the embodiment depicted in FIG. 3. A level tube (300) is connected to a reagent bath (301) such that liquid from the bath (also referred to as "fluid") flows into the tube. The fluid in the tube, which is raised and lowered by changes in the volume of liquid in the reagent bath, raises and lowers a float (302) positioned within the level tube. A signal emitter (303) emits an optical signal "beam" (304) that is directed through a slit aperture (305) towards an optical detector (306). When the liquid force at the opening connecting the level tube and the reagent bath is increased, e.g., through the addition of liquid to the reagent bath, the float rises blocking more of the beam, preventing it from passing through the aperture and reaching the detector. The detector can thus detect and/or quantify the increase in fluid volume in the bath. When the liquid force at the opening connecting the level tube and the reagent bath is decreased, e.g., through removal of liquid from the reagent bath, the float drops blocking less of the beam, allowing more of the beam to pass through the aperture and reach the detector. The detector can thus detect and/or quantify the decrease in fluid volume in the bath.

In some instances, the optical signal detected by the detector may be linearly correlated with the level of liquid in the reagent bath. Linear correlation between the blockage of the optical signal and level of liquid in the bath may be achieved in a number of ways. In some instances, an aperture may be employed to calibrate the system such that the level of liquid in the bath is linearly correlated with the amount of signal detected by the detector. For example, in some instances, a vertical slit aperture present on the level tube is configured in relationship to the emitter-detector pair such that there is a linear correlation between the amount of signal received by the detector and the level of liquid in the bath. In such instances, the position of the float at a known bath liquid level may be determined to calibrate the system. In some instances, movement of the float in a linearly correlated liquid level detection system may allow for quantitative assessments of the change in volume of the bath, change in the liquid level of the bath, etc., such that a measured change in the amplitude of signal detected by the detector may be converted to a measured change in volume, a measured change in liquid level, etc.

For example, a plot depicting linearly correlated detector output versus float position, e.g., as returned from a liquid level indicator such as that depicted in FIG. 3, is depicted in FIG. 4. As depicted in FIG. 4, at each progressive float position (i.e., "1", "2" and "3") more of the signal passing to the detector is blocked. As more of the signal is blocked at each float position the detector amplitude decreases. As such, the detector amplitude varies linearly with the position of the float (see the trend line in FIG. 4).

The result of liquid level assessments, e.g., as performed according to the methods as described herein, may be reported. For example, in some instances, the method may include triggering of an indicator when a liquid level assessment result indicates a particular condition, e.g., the liquid level is at a predetermined level, the liquid level is below a predetermined level, the liquid level is above a predetermined level, the liquid level is outside of a predetermined range, etc. Reports of liquid volume or liquid level assessments may be transmitted in various forms. For example, in some instances, a report may be communicated to a user e.g., by way of an indicator light, alarm or other user interface (e.g., a monitor) that indicates the result of the assessment.

In some instances, the report may be electrically communicated to another aspect of an automated reagent control system. For example, in some instances, a detector reporting the result of an assessment may be connected or otherwise in communication with a processor of the system, such that the report is sent to and processed by the processor. In some instances, upon receiving the report, the processor may trigger some other action of the system including e.g., one or more of the reagent adjustments described herein.

Aspects of the methods of the present disclosure may include performing an automated count of the number of slides being simultaneously processed. Automated slide counting may be performed separately or in addition to any of the other herein described methods, including any of the other herein described assessments such as assessments of reagent bath volume.

As depicted in FIG. 1, slide preparation methods generally include the insertion of at least one slide into one or more reagent baths, after which the at least one slide may be incubated in the reagent bath for some amount of time. As the slide has some volume, inserting the slide into the reagent bath may have an effect on the liquid level of the bath. Such changes in liquid level due to slide displacement may not be significant where large bath volumes are used or few slides are inserted into a bath at any one time. However, where the volume of the bath is kept low (e.g., to minimize the amount of reagents used), the displacement of the slide may significantly impact the liquid level of bath, e.g., raising the liquid above a desired level and/or raising the liquid such that it contacts the specimen information area of the slide. Correspondingly, where a plurality of slides are processed simultaneously the displacement of the slides may significantly impact the liquid level of bath, e.g., raising the liquid above a desired level and/or raising the liquid such that it contacts the specimen information area of the slide.

In some instances, it may be desirable to ascertain the number of slides that will be simultaneously prepared or processed in an automated instrument and adjust the bath liquid level accordingly so that, upon insertion of the slides into the bath, the liquid level reaches but does not exceed a desired or predetermined level. In some instances, detecting the number of slides to be simultaneously prepared or processed may be performed in an automated instrument where the number of slides simultaneously prepared or processed per batch is variable. For example, in some instances, the number of slides simultaneously prepared or processed per batch, whether static or variable, may vary from one slide to 20 slides or more, including but not limited to e.g., 1 slide, 1 slide or more, 2 slides or more, 3 slides or more, 4 slides or more, 5 slides or more, 6 slides or more, 7 slides or more, 8 slides or more, 9 slides or more, 10 slides or more, 11 slides or more, 12 slides or more, 13 slides or more, 14 slides or more, 15 slides or more, 16 slides or more, 17 slides or more, 18 slides or more, 19 slides or more, 20 slides or more, 2 slides, 3 slides, 4 slides, 5 slides, 6 slides, 7 slides, 8 slides, 9 slides, 10 slides, etc.

In some instances, the range of slides that may be simultaneously processed in a batch may be determined by the capacity of a slide carrier device. Such devices will generally include one or more slots or contact points capable of holding a slide during transport through one or more areas of an automated slide preparation device. For example, in some instances, a slide carrier may include a plurality of slots dimensioned for receiving and holding a slide, where e.g., slide dimensions of interest include but are not limited to e.g., those described herein. In some instances, a slide carrier may transport slides between two or more reagent baths and/or to or from addition stations including but not limited to e.g., a specimen application station, a specimen smearing station, a drying station, an imaging station, etc. In some instances, a single slide carrier may be employed in an automated device or multiple slide carriers may be employed.

Figure 5:
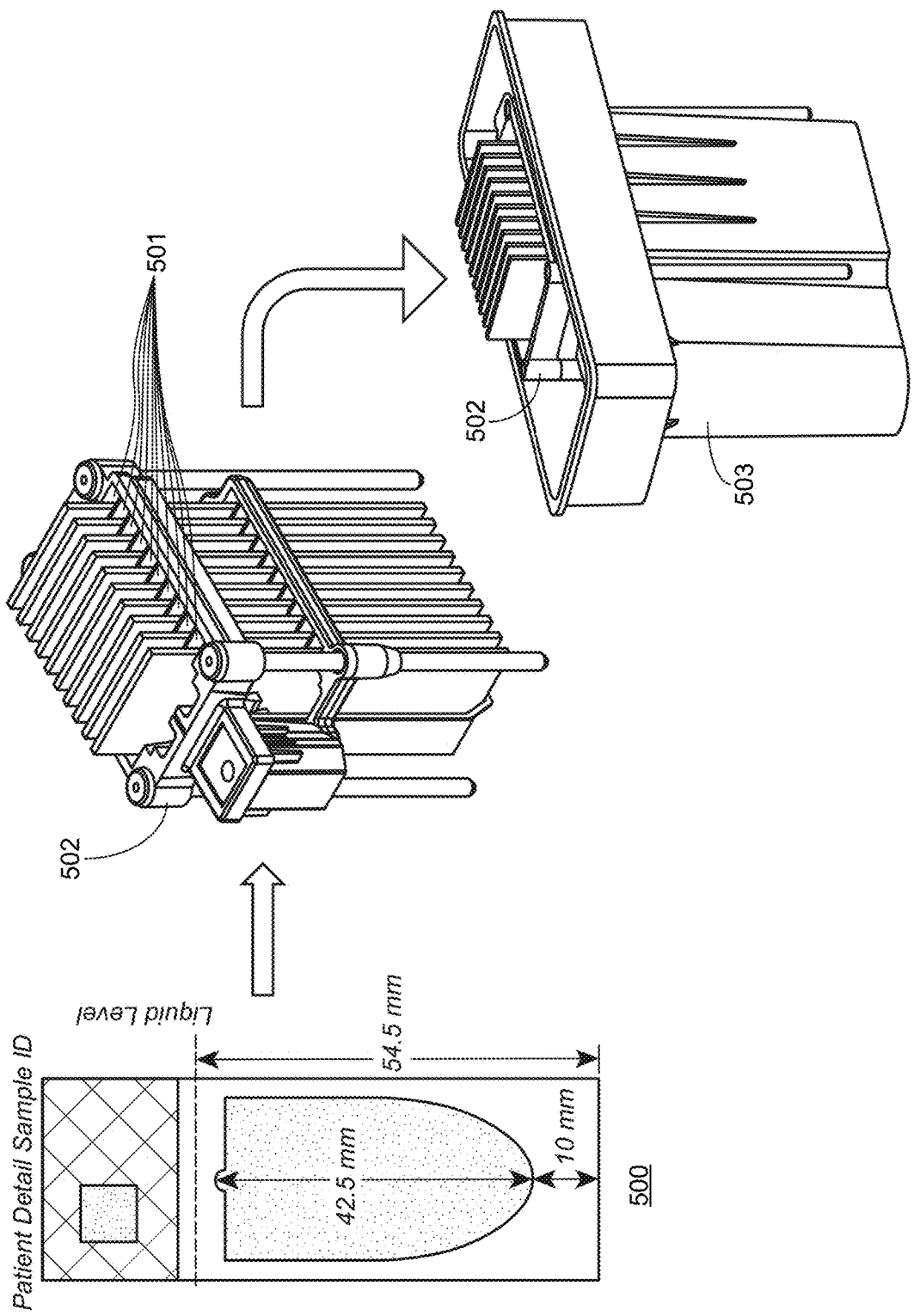
FIG. 5 depicts a slide, a plurality of slides present in a slide carrier, and a slide carrier containing a plurality of slides inserted into a reagent bath according to embodiments of the present disclosure.

Turning now to the embodiment depicted in FIG. 5. A slide (500) or a plurality of such slides, may be contained in the slots (501) of a slide carrier (502) such that the slides hang or are held in a vertical orientation. The slide carrier (502) may then be inserted into a reagent bath (503). The number of slides held by the slide carrier may be assessed at any point before, during or after the slides are inserted into the regent bath.

For example, in some instances, an emitter-detector pair may be positioned such that the slides are inserted or pass through an optical path formed by an emitter-detector pair. Depending on the positioning of the emitter-detector pair, the slides may pass through the optical path formed by the emitter-detector pair at any point before, during, or after transport to or from a reagent bath. In some instances, the slides will pass through the optical path while en route to a reagent bath. In some instances, the slides will pass through the optical path while being transported from a reagent bath. In some instances, the slides will pass through the optical path when inserted into a reagent bath.

Figure 6:
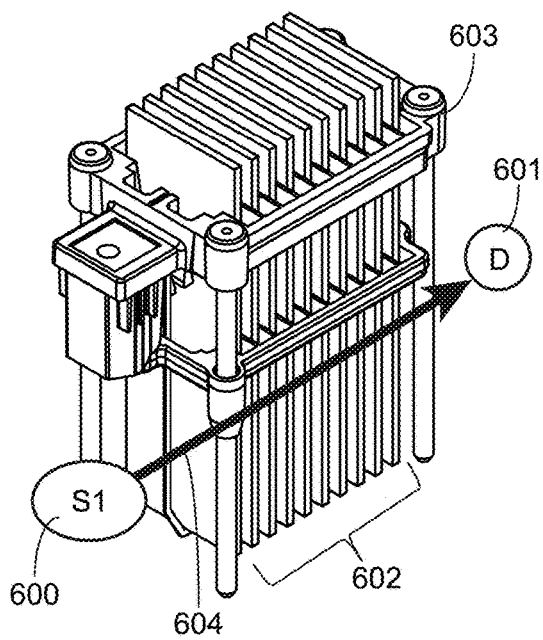
FIG. 6 provides a schematic of the positioning of a signal path, defined by an emitter-detector pair, relative to a plurality of slides present in slide carrier for use in automated slide counting according to one embodiment of the present disclosure.

Regardless of their location along the path of the slide(s), the emitter-detector pair will generally be arranged such that, when the slide(s) pass through or are inserted into the optical path, the optical path is orthogonal to the microscope plane (i.e., the surface to which the specimen is applied) of the slide(s). For example, as depicted in the embodiment of FIG. 6, the emitter (600) may be positioned relative to the detector (601) and the slides (602) held in the slide carrier (603) such that the optical path (604) is essentially orthogonal to the microscope plane of the slides. The angle of the optical path relative to the microscope plane of the slides need not necessarily be perfectly orthogonal and may e.g., be slightly acute relative to true orthogonal provided that the angle is sufficient for the signal produced by the emitter to pass through all slides held by the slide carrier before reaching the detector.

In some instances, the emitter-detector pair are positioned such that the optical path is outside the reagent bath, e.g., along the path taken by the slides to or from the reagent bath or at some other location, e.g., where the slides are held before starting the preparation process. In some instances, the emitter-detector pair are positioned such that the optical path passes through the reagent bath. An optical path that passes through the reagent bath may be achieved in various ways including e.g., by placing one or both of the emitter and detector outside of the bath and passing the signal through the bath in one or more ways including e.g., through the use of an optically transparent or translucent bath, through the use of one or more apertures in the bath walls that allows the signal to pass through to the slides, etc. In some instances, the emitter-detector pair may be positioned within the bath.

In the subject method, the slides employed generally have at least some resistance to the transmittance of light through the slide. As such, in some instances, the slides may be referred to as translucent or semitransparent, where herein the term "translucent" generally refers to a semitransparent characteristic of a material or object that at least partially prevents some light from passing through the material or object. Slides may be translucent prior to staining and may remain translucent or may decrease in transparency after staining, where a decrease in transparency generally refers to a decrease in the transmittance of light through the slide.

Figure 7:
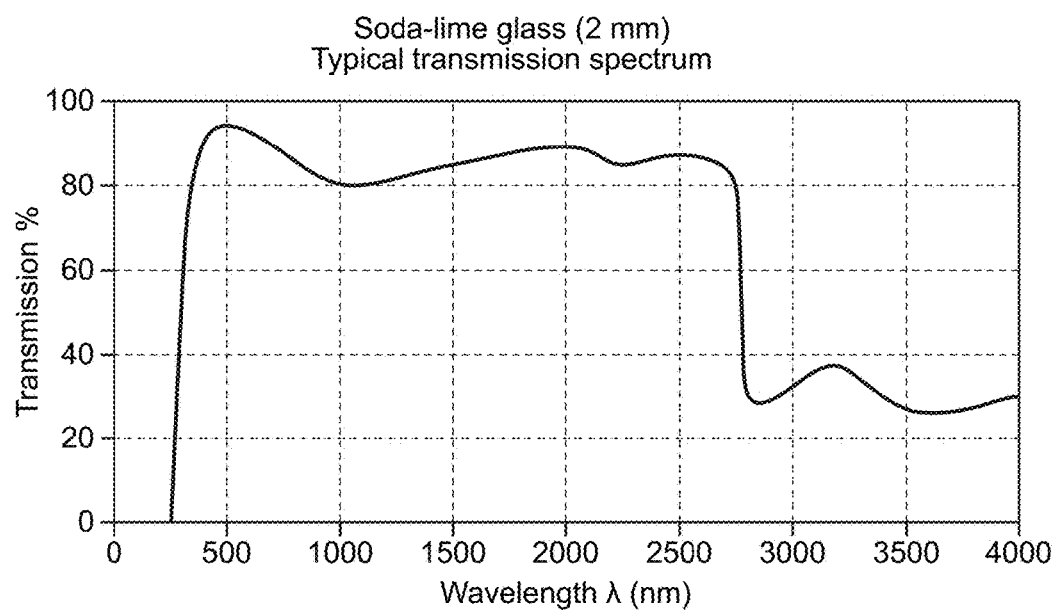
FIG. 7 provides the typical transmission spectrum of soda-lime glass.

Methods of the present disclosure may utilize the translucence (i.e., lack of complete transmittance) of slides in methods of assessing the number of slides held in the slide carrier or inserted or to be inserted into a reagent bath. The translucence of slides may vary depending on various factors including the material from which the slide is constructed, the thickness of the slide, the wavelength at which the translucence is measured, etc. For example, in FIG. 7, the transmission spectrum, i.e., percent transmission at various wavelengths, for a soda-lime glass slide of 2 mm thick is provided. As can be seen in the plot of FIG. 7, the percent transmission at essentially all visible spectrum wavelengths is less than 100%. Thus, measuring the translucence or percent transmission using an optical emitter detector pair at, e.g., 1000 nm a 2 mm soda-lime glass slide would be expected to demonstrate about a 20% drop in the amplitude of signal received by the detector as compared to the amplitude emitted.

Useful wavelengths for assessing the number of slides present will vary depending on various parameters including e.g., the material from which the slides are constructed and such wavelengths may range from less than 100 nm to 1 mm or more, including but not limited to e.g., from 100 nm to 1 mm, from 200 nm to 1 mm, from 300 nm to 1 mm, from 400 nm to 1 mm, from 500 nm to 1 mm, from 600 nm to 1 mm, from 700 nm to 1 mm, from 800 nm to 1 mm, from 900 nm to 1 mm, from 1000 nm to 1 mm, from 1100 nm to 1 mm, from 1200 nm to 1 mm, from 1300 nm to 1 mm, from 1400 nm to 1 mm, from 1500 nm to 1 mm, from 1600 nm to 1 mm, from 1700 nm to 1 mm, from 1800 nm to 1 mm, from 1900 nm to 1 mm, from 2000 nm to 1 mm, from 2100 nm to 1 mm, from 2200 nm to 1 mm, from 2300 nm to 1 mm, from 2400 nm to 1 mm, from 2500 nm to 1 mm, from 100 nm to 0.1 mm, from 200 nm to 0.1 mm, from 300 nm to 0.1 mm, from 400 nm to 0.1 mm, from 500 nm to 0.1 mm, from 600 nm to 0.1 mm, from 700 nm to 0.1 mm, from 800 nm to 0.1 mm, from 900 nm to 0.1 mm, from 1000 nm to 0.1 mm, from 1100 nm to 0.1 mm, from 1200 nm to 0.1 mm, from 1300 nm to 0.1 mm, from 1400 nm to 0.1 mm, from 1500 nm to 0.1 mm, from 1600 nm to 0.1 mm, from 1700 nm to 0.1 mm, from 1800 nm to 0.1 mm, from 1900 nm to 0.1 mm, from 2000 nm to 0.1 mm, from 2100 nm to 0.1 mm, from 2200 nm to 0.1 mm, from 2300 nm to 0.1 mm, from 2400 nm to 0.1 mm, from 2500 nm to 0.1 mm, from 100 nm to 3000 nm, from 200 nm to 3000 nm, from 300 nm to 3000 nm, from 400 nm to 3000 nm, from 500 nm to 3000 nm, from 600 nm to 3000 nm, from 700 nm to 3000 nm, from 800 nm to 3000 nm, from 900 nm to 3000 nm, from 1000 nm to 3000 nm, from 1100 nm to 3000 nm, from 1200 nm to 3000 nm, from 1300 nm to 3000 nm, from 1400 nm to 3000 nm, from 1500 nm to 3000 nm, from 1600 nm to 3000 nm, from 1700 nm to 3000 nm, from 1800 nm to 3000 nm, from 1900 nm to 3000 nm, from 2000 nm to 3000 nm, from 2100 nm to 3000 nm, from 2200 nm to 3000 nm, from 2300 nm to 3000 nm, from 2400 nm to 3000 nm, from 2500 nm to 3000 nm, from 100 nm to 800 nm, from 200 nm to 800 nm, from 300 nm to 800 nm, from 400 nm to 800 nm, from 500 nm to 800 nm, from 600 nm to 800 nm, from 700 nm to 800 nm, from 100 nm to 2500 nm, from 100 nm to 2000 nm, from 100 nm to 1500 nm, from 100 nm to 1000 nm, from 100 nm to 900 nm, from 100 nm to 700 nm, from 100 nm to 600 nm, from 100 nm to 500 nm, from 100 nm to 400 nm, from 100 nm to 300 nm, from 100 nm to 200 nm, from 380 nm to 750 nm, from 380 nm to 620 nm, from 380 nm to 590 nm, from 380 nm to 570 nm, from 380 nm to 495 nm, from 380 nm to 450 nm, from 450 nm to 750 nm, from 450 nm to 620 nm, from 450 nm to 590 nm, from 450 nm to 570 nm, from 450 nm to 495 nm, from 495 nm to 750 nm, from 495 nm to 620 nm, from 495 nm to 590 nm, from 495 nm to 570 nm, from 570 nm to 750 nm, from 570 nm to 620 nm, from 570 nm to 590 nm, from 590 nm to 750 nm, from 590 nm to 620 nm, from 620 nm to 750 nm, etc.

Figure 8:
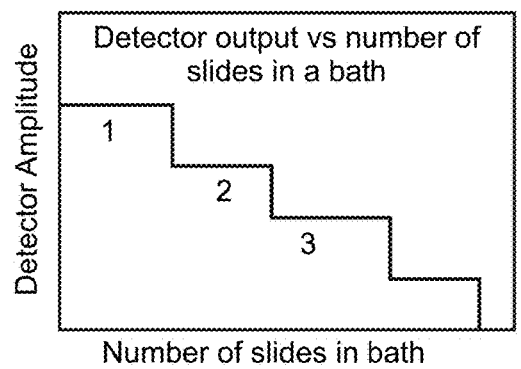
FIG. 8 depicts the step-wise decrease in transmission of an optical signal with increasing number of slides in the optical path.

Accordingly, in some instances, a known or predetermined drop in percent transmission of signal at one or more wavelengths or over a range of wavelengths may be used to detect the presence of a slide and/or a measured cumulative drop may be used to determine the number of slides present. As depicted in FIG. 8, by measuring the detected amplitude at the detector the cumulative drop in transmitted signal may be used to determine the number of slides, e.g., in a bath, held by a slide carrier, etc. As can be seen in FIG. 8, a particular amplitude, e.g., equal to the emitted signal amplitude minus the transmission drop expected when a slide of known translucence is present in the optical path, is measured indicating the presence of one slide in the bath ("1"). Correspondingly, when an amplitude is measured equal to the emitted signal amplitude minus the twice the transmission drop expected when a slide of known translucence is present in the optical path ("2") then the system may indicate that two slides are present. Similarly, when a detector amplitude equivalent to a transmission drop three times that expected from a single slide is measured ("3") then the system may indicate that three slides are present, and so on.

In some instances, e.g., as described above, a measured transmission may be compared to the amplitude of the emitted signal to determine the number of slides present. The amplitude of the emitted signal may be determined in various ways including e.g., executing a measurement of the signal emitted at the detector when no slides are present in the optical path. In some instances, the amplitude of the emitted signal may be based on measuring or otherwise determining or controlling the amount of electrical current provided to the emitter to emit the signal.

In some instances, one or more detector amplitudes may be stored in a computer memory for comparison to a measured detector amplitude, e.g., to make a determination of the number of slides present. For example, in some instances, a detector amplitude in the absence of slides in the optical path may be stored in memory e.g., as a baseline transmission level to which measured values are compared. In some instances, one or more detector amplitudes that correspond to particular slide parameters (e.g., particular slide materials, particular slide thicknesses, etc.) may be stored in memory e.g., for use determining the number of slides present when slides having the particular parameters are used.

Converting a measured signal to a slide count may be achieved in various ways. For example, in some instances, a measured value for an unknown number of slides present in the optical path may be compared to a library of detector amplitude values to identify the number of slides present in the path. In some instances, a measured value for an unknown number of slides of a particular type present in the optical path may be compared to a known value for the percent transmission corresponding to one slide of the particular type to calculate and identify the number of slides present in the path.

As described in greater detail below, in some instances, adjustments may be made based on assessments of the number slides present. For example, in some instances, a reagent bath volume may be adjusted based on an assessment of the number of slides present according to the methods described herein, e.g., such that the bath liquid level is maintained at a desired or predetermined level when the slides are present in the bath.

Methods involving an assessment of slide number may be performed solely for the purpose of slide counting or may be performed as part of an integrated system of maintaining a reagent bath volume or liquid level. In some instances, an assessment of slide number may be performed as part of an integrated system of maintaining the reagent bath volume or liquid level of a bath in which the assessed slides reside.

In some instances, an assessment of slide number may be performed in a multi-bath slide preparation system, such that the assessed number of slides is utilized to adjust and/or control the liquid level or volume for one or more baths of the system. For example, in some instances, an assessment of slide number may be performed when the slides are associated with a first bath, also referred to herein as a primary bath, and the assessment may be used in an assessment or adjustment of liquid volume of a second bath into which the slides are introduced after the primary bath. As used herein, relative to reagent baths by "associated with" is meant the slides will, are or have recently been inserted into the bath and, as such, slides associated with a particular bath are en route to, in, or traveling from the bath. Depending on the slide preparation protocol employed, a primary bath and a secondary bath may be any reagent bath, including those described herein, including but not limited to e.g., fixation baths, wash baths, staining baths, etc.

Figure 9:
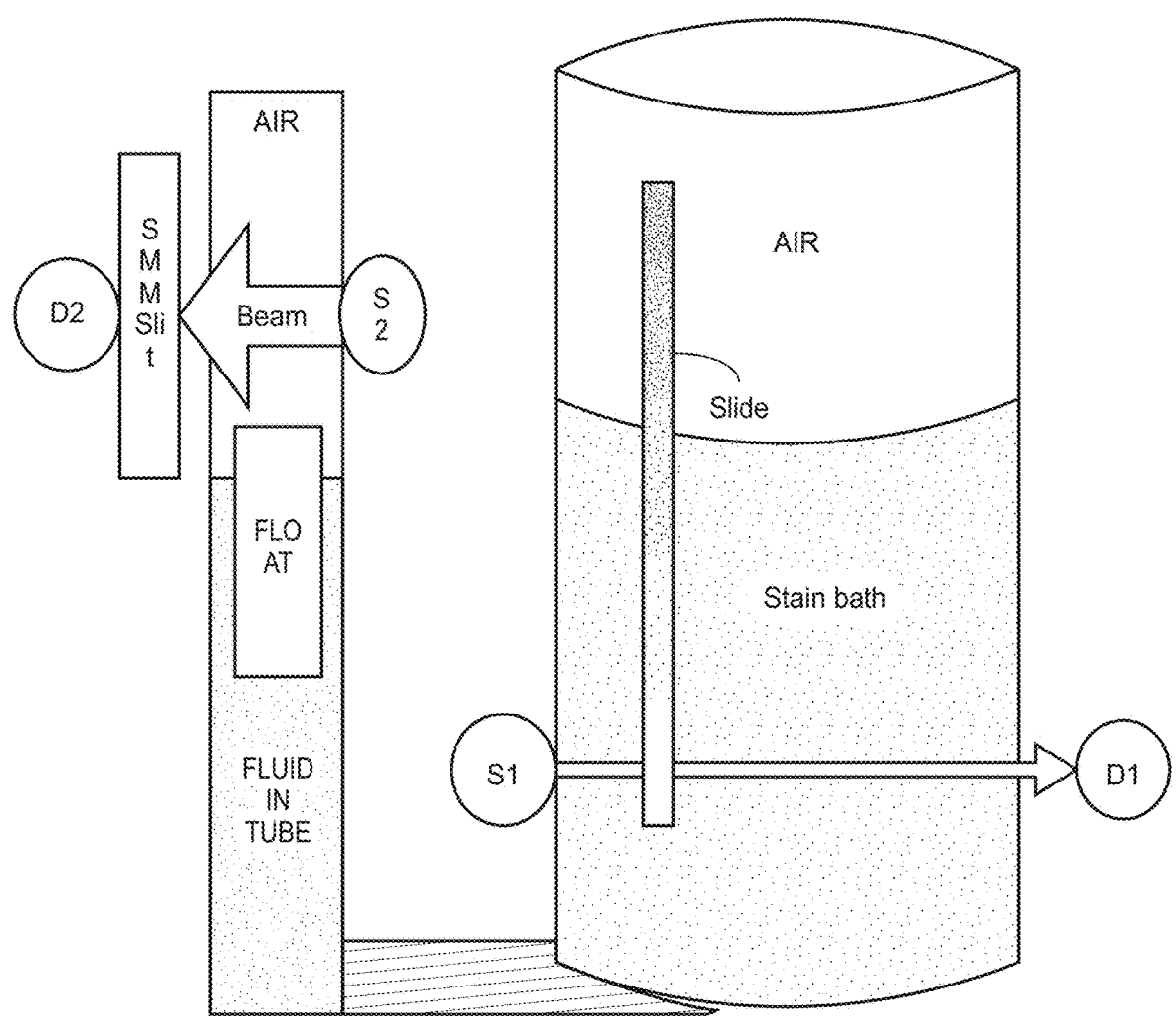
FIG. 9 provides a schematic representation of an integrated system combining an automated volume indicator and an automated slide counter system according to one embodiment of the present disclosure.

In some instances, assessments described herein may be combined, including e.g., where an assessment of reagent bath volume is combined with an assessment of slide number. Combined assessments may be made relative to a single reagent bath or across two or more different reagent baths. For example, as depicted in the embodiment of FIG. 9, a first emitter-detector pair ("S1" and "D1") may be positioned to assess the number of slides ("SLIDE") present in a reagent bath and a second emitter-detector pair ("S2" and "D2") may be positioned to assess the volume of liquid present in a reagent bath using the level tube design described above. In some instances, a first emitter-detector pair that assesses the number of slides present in a reagent bath and a second emitter-detector pair that assesses the volume of liquid present in a reagent bath that are both used in combined assessment may be present on or associated with the same reagent bath.

In some instances, a first emitter-detector pair that assesses the number of slides present in a reagent bath and a second emitter-detector pair that assesses the volume of liquid present in a reagent bath that are both used in combined assessment may be present on or associated with separate reagent baths. For example, a first emitter-detector pair may be present associated with a primary bath to assess the number of slides present and a second emitter-detector pair may be present associated with a reagent bath such that the assessed slide number at the primary bath is used in combination with the assessed liquid volume to determine whether an adjustment to the liquid level of the reagent bath is necessary.

Figure 10:
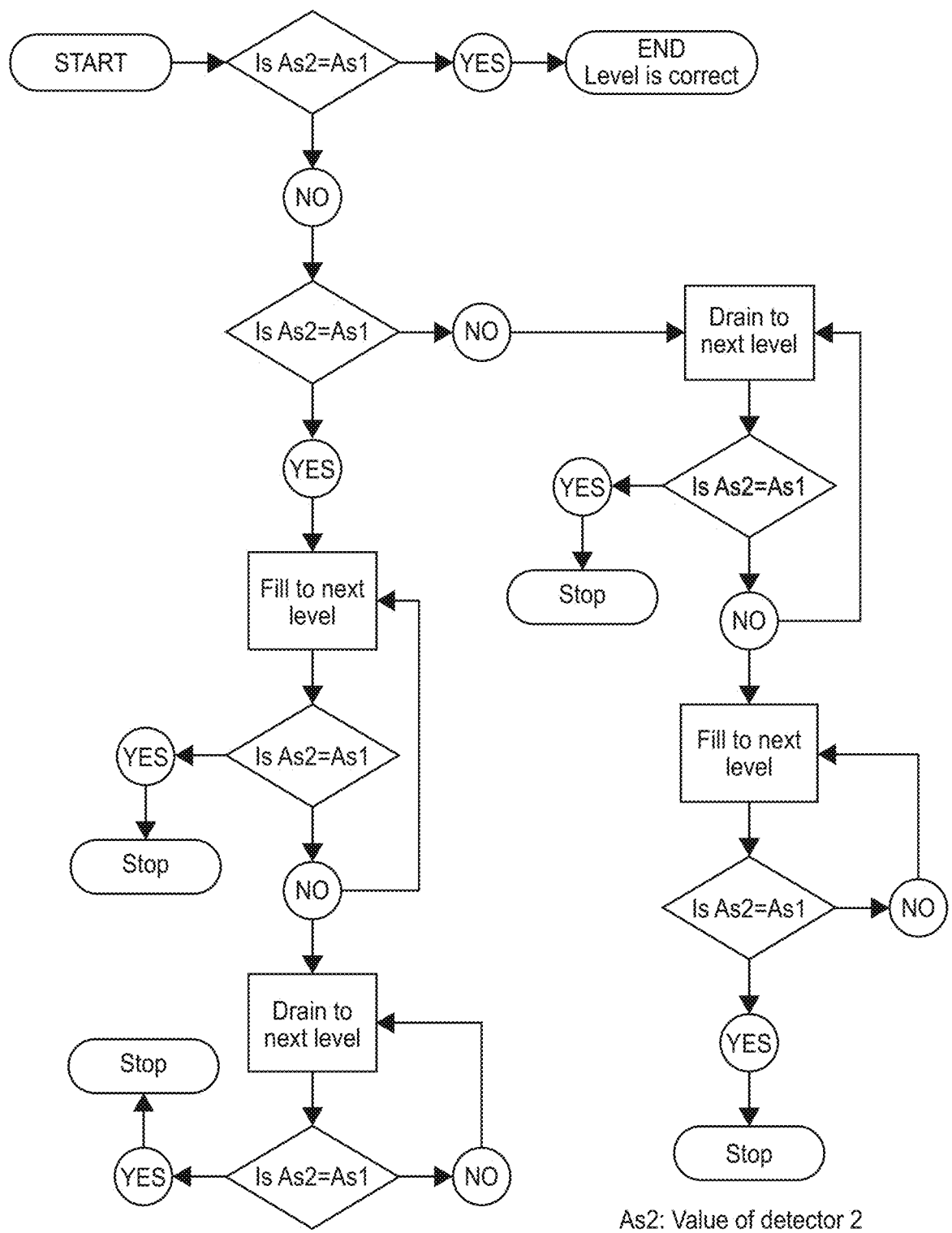
FIG. 10 provides a logic diagram useful in an embodiment of automated liquid level assessment and adjustment as described herein.

As an example, a logic diagram for liquid level control, corresponding to one embodiment of a combined assessment, is depicted in FIG. 10. In the logic diagram, a value corresponding the liquid level of a reagent bath is determined ("AS2") and compared to a calculated value for the reagent bath based on the assessed number of slides en route to the reagent bath ("AS1"). If the two values are equal, then no adjustment is necessary to maintain the bath at the desired or predetermined liquid level. If the values are not equal, then a necessary adjustment may be determined and/or made based on the difference between the values and various drain/fill loops and/or additional assessments may be triggered accordingly, e.g., similar to those depicted in FIG. 10.

Combination assessments are not limited to those explicitly described and various combinations of assessments, e.g., combining any number of slide number assessments, liquid volume assessments, and/or combinations thereof, may be employed in the herein described methods. The individual assessments of combined assessments may also be made in any convenient and appropriate order, and thus may also vary greatly depending e.g., on the slide preparation protocol employed.

Assessing Reagent Quality

In some instances, methods of the instant disclosure may include making an assessment of the quality of a reagent used in an automated apparatus for slide preparation. For simplicity and clarity, methods for assessing reagent quality will be described below in the context of staining of a histological or hematological slide for histological or hematological analysis; however, an ordinary skilled artisan will readily understand that the methods are not so limited and may find use in various other contexts where the assessment of reagent quality utilized in a staining process, such as or similar to histological staining, is desired.

Aspects of the present methods include analysis of a stained blank slide. As used herein, the term "stained blank slide" generally refers to a slide that does not contain a specimen but is stained according to the procedures used to stain a specimen containing slide. As such, in some instances, the methods of the present disclosure may include the staining of at least one blank slide to produce a stained blank slide. The staining of a blank slide may be performed in series or in parallel with the staining of one or more specimen slides. For example, in some instances, a blank slide may be stained before or after the staining of one or more specimen slides using the same reagent bath(s) as used in staining the specimen slide(s). In some instances, a blank slide may be processed along with one or more specimen slides and thus may be subjected to essentially the same slide preparation steps as the one or more specimen slides with the exception of the application of the specimen to the slide. Processing of a blank slide "along with" one or more specimen slides may also be referred to herein as "simultaneously staining", e.g., simultaneously staining a blank slide and one or more specimen slides.

In some instances, a blank slide may be placed in a designated position in a slide carrier for processing along with one or more specimen slides. In successive rounds of staining the designated position in the slide carrier may be held constant or may be varied including e.g., varied systematically, varied randomly, etc. For example, in a slide carrier having a plurality of slots, e.g., numbered 1 to 10 from front to back, a blank slide may be placed in position 1 and not varied from position 1 during successive staining runs. In some instances, a blank slide may be placed in position 1 for an initial run and systematically varied thereafter, e.g., by placing the next blank slide in position 2 during the next run, position 3 during the next run, position 4 during the next run, etc. In some instances, a blank slide may be placed in position 1 for an initial run and randomly varied thereafter, e.g., by placing the next blank slide in position 7 during the next run, position 3 during the next run, position 10 during the next run, etc.

In some instances, blank slides may be exclusively or more commonly placed in positions subject to greater variation in staining as compared to other positions in a slide carrier. For example, in some instances, the blank slide may be more commonly or exclusively placed in an outside position, i.e., a position at one end of a slide carrier carrying a plurality of slides, e.g., position 1 or position 10 in a slide carrier having a plurality of slots numbered 1 to 10 from front to back. As described elsewhere herein, a slide carrier may not necessarily have 10 slots as described in the above examples as the number of slides carried by a slide carrier and the capacity of a slide carrier may vary as desired, e.g., according to the particular instrument employed.

The present methods will generally include acquiring one or more images of a stained blank slide for analysis in making a quality assessment. By acquiring one or more images of a stained blank slide parameters of the quality of the reagents used in the preparation of the slides may be determined. For example, in some instances, parameters obtained from images of a stained blank slide may be utilized to assess the quality of a stain or staining reagent used in preparing the slides. As a non-limiting example, assessing parameters corresponding to background staining on a stained blank slide may indicate the quality of the stain used in preparing the slide.

Assessments of the quality of reagents used in the preparation of slides may produce various results. For example, an assessment as described herein may indicate that the reagents generate histologically stained slides of sufficient quality for histological analysis, including e.g., automated histological analysis by an automated analyzer. In some instances, an assessment as described herein may indicate that the reagents generate histologically stained slides of insufficient quality for histological analysis, including e.g., automated histological analysis by an automated analyzer. Characteristics of an analysis indicating insufficient quality may vary and may include but are not limited to e.g., staining intensity outside of a predetermined range (e.g., above a predetermined threshold, below a predetermined threshold, etc.), staining variability outside of a predetermined range (e.g., above a predetermined threshold), optical transparency outside of a predetermined range (e.g., below a predetermined threshold, etc.), the presence of debris (e.g., the presence of debris above a predetermined threshold), the presence of streaks (e.g., the presence of streaks above a predetermined threshold), etc. All characteristics of a stain or other reagent measurable by the methods set forth herein may, as appropriate, be utilized in assessments of quality as described herein.

As noted above, the present methods will generally include the acquisition of one or more images of a stained blank slide. In some instances, e.g., where stained blank slides and unstained slides are compared, the methods may also include acquisition of one or more images of an unstained slide, where the term "unstained slide" generally refers to a blank slide, i.e., a slide not containing a specimen, which is not subjected to any staining procedure. Such unstained slides may serve as a control or baseline or reference, e.g., as a baseline reference for percent transmission.

Any convenient and appropriate imaging device may find use in acquiring images as described in the present methods including e.g., a microscope equipped with a digital camera, e.g., as described in more detail below. In some instances, the imaging device used to capture the one or more images of a stained blank slide is the same imaging device utilized to capture images of the specimen slides, referred to herein in some instances as the "specimen slide imaging device". In some instances, the imaging device used to capture the one or more images of a stained blank slide is a device separate from the imaging device utilized to capture images of the specimen slides.

In some instances, one image of a stained blank slide may be acquired and used in subsequent analysis. In some instances, a plurality of images of a stained blank slide may be acquired and used in subsequent analysis. Where a plurality of images of a stained blank slide are acquired the number of images acquired and utilized may vary and may include 2 or more but generally not more than 100 images including but not limited to e.g., 2 or more, 3 or more, 4 or more, 5 or more, 6 or more, 7 or more, 8 or more, 9 or more, 10 or more, 15 or more, 20 or more, 25 or more, 30 or more, 35 or more, 40 or more, 45 or more, 50 or more, 60 or more, 70 or more, 80 or more, 90 or more, from 2 to 100, from 2 to 90, from 2 to 80, from 2 to 70, from 2 to 60, from 2 to 50, from 2 to 45, from 2 to 40, from 2 to 35, from 2 to 30, from 2 to 25, from 2 to 20, from 2 to 19, from 2 to 18, from 2 to 17, from 2 to 16, from 2 to 15, from 2 to 14, from 2 to 13, from 2 to 12, from 2 to 11, from 2 to 10, from 2 to 9, from 2 to 8, from 2 to 7, from 2 to 6, from 2 to 5, from 2 to 4, from 3 to 100, from 3 to 90, from 3 to 80, from 3 to 70, from 3 to 60, from 3 to 50, from 3 to 45, from 3 to 40, from 3 to 35, from 3 to 30, from 3 to 25, from 3 to 20, from 3 to 19, from 3 to 18, from 3 to 17, from 3 to 16, from 3 to 15, from 3 to 14, from 3 to 13, from 3 to 12, from 3 to 11, from 3 to 10, from 3 to 9, from 3 to 8, from 3 to 7, from 3 to 6, from 3 to 5, from 4 to 100, from 4 to 90, from 4 to 80, from 4 to 70, from 4 to 60, from 4 to 50, from 4 to 45, from 4 to 40, from 4 to 35, from 4 to 30, from 4 to 25, from 4 to 20, from 4 to 19, from 4 to 18, from 4 to 17, from 4 to 16, from 4 to 15, from 4 to 14, from 4 to 13, from 4 to 12, from 4 to 11, from 4 to 10, from 4 to 9, from 4 to 8, from 4 to 7, from 4 to 6, from 5 to 100, from 5 to 90, from 5 to 80, from 5 to 70, from 5 to 60, from 5 to 50, from 5 to 45, from 5 to 40, from 5 to 35, from 5 to 30, from 5 to 25, from 5 to 20, from 5 to 19, from 5 to 18, from 5 to 17, from 5 to 16, from 5 to 15, from 5 to 14, from 5 to 13, from 5 to 12, from 5 to 11, from 5 to 10, from 5 to 9, from 5 to 8, from 5 to 7, from 10 to 100, from 10 to 90, from 10 to 80, from 10 to 70, from 10 to 60, from 10 to 50, from 10 to 45, from 10 to 40, from 10 to 35, from 10 to 30, from 10 to 25, from 10 to 20, from 10 to 19, from 10 to 18, from 10 to 17, from 10 to 16, from 10 to 15, from 10 to 14, from 10 to 13, from 10 to 12, from 20 to 100, from 20 to 90, from 20 to 80, from 20 to 70, from 20 to 60, from 20 to 50, from 20 to 45, from 20 to 40, from 20 to 35, from 20 to 30, from 20 to 25, etc.

A plurality of images may be acquired such that each image represents a different area of the slide, where such different areas may or may not partially overlap, and the acquired images represent a plurality of different areas of the slide. Different areas of a slide acquired in a plurality of images may adjacent or non-adjacent and be distributed in any convenient manner including systematically or randomly.

In some instances, a plurality of different areas may be distributed along a path made on the surface of the slide. Any convenient and appropriate path along the surface of the slide may find use in the methods described herein including but not limited to e.g., a path parallel to a long axis of the slide (e.g., a path along the middle of the long axis of the slide, a path off-center along the long axis of the slide, etc.), a path parallel to a short axis of the slide (e.g., a path along the middle of the short axis of the slide, a path off-center along the short axis of the slide, etc.), a path along a diagonal (e.g., from a corner of the specimen area of a slide to a diagonal corner of the specimen area of the slide), etc. In some instances, multiple paths may be employed, including multiple parallel paths, multiple non-parallel paths (e.g., two perpendicular paths), etc.

In some instances, multiple non-parallel paths may be employed to more readily detect characteristics of stain quality that may more commonly correlate with a particular axis of the slide. For example, in some instances, a plurality of images captured along two non-parallel axes may be employed to detect streaks which may correlate in orientation with the long axis of the slide. Where images are acquired along multiple non-parallel paths, in some instances, the non-parallel paths (including e.g., perpendicular paths) may be compared, e.g., by comparing parameters calculated for each path separately and comparing the calculated values.

Images captured according to the present methods may include digital images that are monochrome (digital monochrome or "grayscale") or color (digital color image). A "digital image", as used herein, generally refers to a numeric representation (e.g., binary representation) of a two-dimensional image that may be of fixed or unfixed resolution. Fixed resolution images have a fixed number of rows and columns of pixels in an XY orientation. In some instances, digital images may be three-dimensional having fixed number of voxels in a XYZ orientation. Pixels and voxels are stored in computer memory as a raster image or raster map, a two-dimensional or three-dimensional array of small integers transmitted or stored in an uncompressed or compressed form. Suitable digital image file formats include but are not limited to e.g., BMP, BPG, CD5, DEEP, ECW, Exif, FITS, FLIF, GIF, HDR, HEIF, ILBM, ILBM, IMG, IMG, JPEG 2000, JPEG XR, JPEG/JFIF, Layered Image File Format, Nrrd, PAM, PBM, PCX, PGF, PGM, PLBM, PNG, PNM, PPM, SGI, SID, Sun Raster, TGA, TIFF, VICAR, WEBP, and the like.

Digital images may be a variety of image bit depths depending, e.g., on the particular type of image captured (e.g., color or grayscale) and the sensitivity of the digital camera or other image capture device and may include but are not limited to e.g., 8-bit, 10-bit, 12-bit, 14-bit, 16-bit, 18-bit, 24-bit, 30-bit, 36-bit, 48-bit, 64-bit, and the like. In some instances, the channels of a color image may individually be, or may be split into, individual 8-bit grayscale images. In some instances, the channels of a color image may individually be, or may be split into, individual 16-bit grayscale images. In some instances, a digital color image may be generated from multiple individually captured grayscale images that are combined into a single image by assigning the individually captured grayscale images to different color channels of the single image. In other instances, all the colors of a digital color image are captured simultaneously, e.g., through the use of an image capture device having multiple photo detectors assigned to different colors and one or more optical devices for directing light of different colors to different photo detectors.

Digital images may be binary (e.g., black and white), grayscale or color formats and may be converted between formats by suitable image processing algorithms. For example, a color image may be "split" into individual color channels to produce individual grayscale images for each color channel. For example, a red, green and blue image (RGB) image may be split into individual red, green and blue channels to produce a grayscale image of the red channel, a grayscale image of the green channel and a grayscale image of the blue channel. Color images may be converted between color spaces and split into any convenient and appropriate color channels of a particular color space including but not limited to e.g., RGB color space, CMYK color space, HSV color space, CIE color space, Lab color space, CIELUV color space, YCbCr color space, and the like. Binary images and grayscale images may be applied to a channel of a color image and, e.g., where multiple binary or grayscale images are applied to multiple channels of a color image, a color image may be constructed, or "merged", from binary and/or grayscale images. Where a color image is split into individual color channels to produce grayscale images, an individual grayscale image may be referred to by its prior channel designation, e.g., a grayscale image produced from the red channel may be referred to as "red" in subsequent steps and/or any values generated from the "red" channel may be referred to by their prior channel designation, e.g., the mean "red" intensities refers to the mean intensity values derived from the grayscale image produced from the red channel. Images and values derived from other color spaces may be referred to using corresponding nomenclature.

Acquired digital color images may be captured using any suitable color enabled image capturing device. Suitable digital color image capturing devices will be stand-alone image capture units or may be an integrated image capturing device that is part of a larger analysis system including e.g., a histology analyzer, an automated microscopy system, a hematology analyzer, etc. Suitable digital color image capturing devices will vary greatly depending on the particular imaging context, the purposes of image capture and the associated components of the device or system as a whole.

At a minimum a suitable color image capturing device, for use in the described methods, will include a digital color camera capable of capturing a digital color image and a means of storing the digital color image and/or transferring the image to attached image processing circuitry or to an attached storage device for later transfer to image processing circuitry. Suitable digital color cameras will vary and will generally include any digital color camera with sufficiently high resolution and sufficient color capture to capture an image that may be processed according to the methods described herein.

Accordingly, digital color images may be processed as color images (i.e., as multichannel images) or may be converted or split into two or more individual color channels as part of the image processing. When split into two or more individual color channels, any number of the resulting split images may be used in further processing steps including but not limited to all the split images (i.e., all the individual channels of the image) or only one of the split images (i.e., only one of the individual channels of the image) or one or more, including but not limited to two or more, three or more, two, three, etc. of the split images (i.e., the individual channels of the image).

Processing of the acquired images will generally include extracting at least one parameter value from the image used in the methods of assessing as described herein. In some instances, two or more parameter values may be extracted from a single image. In some instances, two or more parameter values may be extracted from two or more images taken from the same stained blank slide. Multiple parameter values extracted from the same image or from associated images (i.e., images obtained from the same blank stained slide, images obtained along the same imaging path, images obtained along related (e.g., perpendicular) paths, etc.) may be combined, e.g., into a representative signature. Representative signatures generated from compiling multiple parameter values may be representative of various features of a slide preparation process including one or more reagents of the process.

In some instances, multiple parameters may be combined to generate a signature representative of a stain used in the preparation of a histologically stained slide including where the signature representative of the background produced from the stain used (i.e., a background stain signature). A signature may include any number of individual parameter values, depending on what the signature represents, where the number of individual parameter values in a signature may vary and may range from 2 to 20 or more including but not limited to e.g., 2 individual values, 3 individual values, 4 individual values, 5 individual values, 6 individual values, 7 individual values, 8 individual values, 9 individual values, 10 individual values, 11 individual values, 12 individual values, 13 individual values, 14 individual values, 15 individual values, 16 individual values, 17 individual values, 18 individual values, 19 individual values, 20 individual values, etc.

Parameter values extracted during image processing will vary depending on the assessment being made. Non-limiting examples of parameter values that may be extracted include but are not limited to intensity values, uniformity values, etc. Such parameter values may be extracted by any convenient and appropriate means including e.g., through analysis of the image histogram. Statistical calculations may be performed in generating a parameter value where non-limiting examples of useful statistical calculations may include e.g., calculating the mean based on data obtained from the image, calculating the median based on data obtained from the image, calculating the minimum based on data obtained from the image, calculating the maximum based on data obtained from the image, calculating the standard deviation based on data obtained from the image, calculating the mode based on data obtained from the image, etc.

Parameter values may be extracted or calculated for an entire image, a portion of an image, multiple images, multiple portions of multiple images, etc. Similarly, parameter values may be calculated for all channels of a color image or portion thereof or a grayscale image or portion thereof. For example, a calculation of the intensity value of a color image or portion thereof or a grayscale image or portion thereof may be referred to as the overall staining intensity. A calculation of the standard deviation of a color image or portion thereof or a grayscale image or portion thereof may be referred to as the overall standard deviation. Calculation of a parameter value for a single channel of a color image may be referred to relative to the channel from which the data was derived. For example, a calculation of the intensity value of the red channel of an image or portion thereof may be referred to as red staining intensity. A calculation of the intensity value of the green channel of an image or portion thereof may be referred to as green staining intensity. A calculation of the intensity value of the blue channel of an image or portion thereof may be referred to as blue staining intensity. Corresponding means, medians, standard deviations, etc., for such images may also be obtained in extracting parameter values as described herein.

Measures of variance, e.g., standard deviation and the like, may be used in extracting a uniformity value and will generally involve the assessment of multiple images and/or multiple areas of a single image or multiple images. For example, an overall uniformity value for staining intensity may be extracted from a plurality of color images acquired from a stained blank slide and calculating the standard deviation of the intensity of the images of the plurality. Similarly, a uniformity value for red staining intensity may be extracted from a plurality of red channel images acquired from a stained blank slide and calculating the standard deviation of the red intensity of the images of the plurality. The calculation of other variance related parameter values, e.g., for other channels, for other statistical measures, etc., will be readily understood.

In some instances, a parameter value will be calculated relative to a reference value. For example, in some instances, a reference value corresponding to the parameter measured on an unstained slide will be used in calculating a relative parameter value. A reference value used in determining such relative parameter values may be previously measured and stored, e.g., in a computer memory, or may be newly measured, e.g., measured from an unstained slide before, during or after the image of the stained blank slide is acquired. One non-limiting example of a relative parameter value utilizing a reference value from an unstained slide is an optical transparency coefficient. In determining the optical transparency coefficient, the optical transparency of an image obtained from a stained blank slide may be determined by comparing an intensity measure of the stained blank slide to a reference value of intensity obtained for an unstained slide. Optical transparency coefficient may be expressed as the percent transmission of the stained blank slide as compared to the unstained reference.

Comparisons of stain signatures may be performed by obtaining a stain signature for a stained blank slide and comparing the signature to a reference stain signature. Such reference stain signatures may be previously measured and stored, e.g., in a computer memory, or may be newly measured, e.g., measured from a stained blank slide of known stain quality before, during or after the image of the stained blank slide prepared with a stain of unknown quality is acquired. Reference slides stained with a stain of known quality will vary. In some instances, a stained blank slide prepared with a stain known to be of sufficient quality to produce histologically analyzable stained specimens may be used. In such instances, the signature obtained from the stained blank slide that is compared to the reference may be compared to determine if the signature is within some margin of quality as compared to the reference. In some instances, a stained blank slide prepared with a stain known to be of insufficient quality to produce histologically analyzable stained specimens may be used. Non-limiting examples of slides prepared with stains known to be of insufficient quality include but are not limited to e.g., stains known to stain cells with an intensity that inhibits accurate analysis (e.g., overly intense, insufficient intensity, etc.), stains known to stain cells with a variability that inhibits accurate analysis, stains known to have an excess amount of debris that inhibits accurate analysis, stains known to promote the formation of streaks, and the like.

In some instances, one or more parameter values may be utilized to compare the blank stained slide to a quality threshold value. Accordingly individual parameter values or combination signatures may be utilized for comparison to threshold values, e.g., parameter threshold values or signature threshold values. Threshold values will vary and may generally represent the minimum or maximum single value or multiple parameter values that are sufficient for staining of a specimen containing slide to be accurately assessed according to an automated histological analysis system. For example, a maximum background staining intensity threshold value may represent the maximum background intensity at which a specimen slide may be analyzed in an automated histological analysis system to achieve accurate cell classification, above which accurate cell classification is not achieved. As another example, a maximum variability threshold value may represent the maximum staining variability at which a specimen slide may be analyzed in an automated histological analysis system to achieve accurate cell classification, above which accurate cell classification is not achieved.

In some instances, an overall quality signature threshold, representing a combination of individual parameter value thresholds may be employed. An assessed stain signature may be compared to an overall quality signature threshold and the stain may be determined to be of sufficient quality for accurate automated histological analysis when the assessed stain signature exceeds the quality threshold. Such an overall quality signature threshold may incorporate any number of the above described parameter values, where e.g., the actual measured values may be converted into components of a quality score. For example, the overall quality score for a stain signature may include some combination of a score for overall staining intensity, a score for individual channel staining intensity, a score for overall stain variability, a score for individual channel stain variability, a score for optical transparency, a score for the presence or absence or level of debris, a score for the presence or absence or level of streaking, etc. An overall quality signature threshold may be based on a similar combination of parameter values obtained for a blank slide prepared using a stain of known quality.

The result of one or more of the assessments of the present method may be used in further processes or be directly reported to a user or an automated component of an automated slide preparation and/or analysis system. For example, in some instances, a report may be communicated to a user e.g., by way of an indicator light, alarm or other user interface (e.g., a monitor) that indicates the result of the assessment.

In some instances, the report may be electrically communicated to another aspect of an automated system. For example, in some instances, a processor reporting the result of an assessment may trigger some other action of the system including e.g., one or more of the reagent adjustments described herein.

Based on one or more assessments of the present methods, an adjustment may be made, described in greater detail below. For example, when a stain is assessed and found to be of insufficient quality to produce accurate automated histological cell classification, one or more reagents of the preparation protocol may be drained and replaced. Such adjustments need not be limited to draining and/or replacement of one or more components of a slide preparation protocol, such as a stain, and may include e.g., addition of one or more components to a stain, a change in the process timing or environment, etc.

Adjustments

In some instances, methods of the instant disclosure may include making an adjustment of a slide preparation process or step or a reagent used in an automated apparatus for slide preparation. For simplicity and clarity, methods for adjusting, e.g., the length of a processing step, the speed of a processing step, the volume of a regent, the composition of a reagent, replacing a reagent, etc., based on one or more of the various assessments described herein will be described below in the context of preparing a histological or hematological slide for histological or hematological analysis; however, an ordinary skilled artisan will readily understand that the methods are not so limited and may find use in various other contexts where assessment-based adjustments of a staining process, such as or similar to other histological staining processes, is desired.

Assessments of the present methods may include an adjustment, e.g., filling, draining, supplementing, rinsing, etc., of a fixation bath. Such adjustments may include, depending on the assessment, replacement of some or the entire contents of the fixation bath. In some instances, such adjustments may include an adjustment of a component of the reagent bath liquid including but not limited to e.g., an alcohol fixative (methanol, ethanol, isopropyl alcohol, etc.) or a solution containing an alcohol fixative, a formaldehyde-based fixative or a solution containing a formaldehyde-based fixative.

Assessments of the present methods may include an adjustment, e.g., filling, draining, supplementing, rinsing, etc., of a wash bath. Such adjustments may include, depending on the assessment, replacement of some or the entire contents of the wash bath. In some instances, such adjustments may include an adjustment of a component of the reagent bath liquid including but not limited to e.g., a detergent or a solution containing a detergent, a wash buffer, water, etc.

Assessments of the present methods may include an adjustment, e.g., filling, draining, supplementing, rinsing, etc., of a staining bath. Such adjustments may include, depending on the assessment, replacement of some or the entire contents of the staining bath. In some instances, such adjustments may include an adjustment of a component of the reagent bath liquid including but not limited to e.g., one or more dye components of a stain or a solution containing a dye component of a stain. In some instances, the subject stains include histological stains which may be adjusted as described by the filling, draining, supplementing, rinsing, etc., of a staining bath containing the histology stain and/or adjustment of any one or more components of such a stain.

As used herein, histology stains refer to those stains used in microscopic analysis of the cellular anatomy and/or morphology of cells obtained from a multicellular organism. Histology stains generally include at least one dye that stains one or more cell types and/or components of one or more cell types a contrasting color. Histology stains may also include at least one counter-stain that stains the rest of the cells or the rest of the cell a different color. Histological techniques, stains and staining methods are well-known and include but are not limited to those described in Kierman. *Histological and histochemical methods: Theory and practice.* Oxford: Butterworth/Heinemann, 1999 and Bancroft & Stevens. *Theory and practice of histological techniques.* New York, N.Y. Churchill Livingstone, 1996; the disclosures of which are incorporated herein by reference in their entirety.

Histological staining techniques can be specific, staining one or more particular cells in a specific way, or non-specific, staining essentially all cells or most cells in the same or similar way. Histology stains include but are not limited to e.g., Alcian blue stains, Aniline blue stains, Azan stains, Biebrich scarlet-acid fuchsin stains, Carbol-fuchsin stains, Chrome alum/haemotoxylin stains, Congo Red stains, Crystal violet stains, Fast Red stains, Hematoxylin and Eosin (H&E) stains, Iron Hematoxylin stains, Isam in blue/eosin stains, Jenner's stains, Mallory's Phosphotungstic Acid Hematoxylin (PTAH) stains, Mallory's Trichrome stains, Masson stains, Malachite Green stains, Methyl Green-Pyronin (MGP) stains, Nissl and methylene blue stains, Nissl stains, Oil Red O stains, Orcein stains, Osmic Acid stains, Osmium Tetroxide stains, Papanicolaou stains, Periodic Acid-Schiff (PAS) stains, Reticulin stains, Romanowsky stains, Safranin O stains, Silver stains, Sudan Black and osmium stains, Toluidine-blue stains, Trichrome AB, Trichrome LG, Trypan Blue stains, van Gieson stains, Verhoff's stains, Weigert's resorcin-fuchsin stains, and the like.

Dyes included in histology stains will vary depending on the stain formulation and the desired staining result. In some instances, dyes useful in histology stains may include but are not limited to, e.g., Acid Fuchsin calcium salt, Acid fuschin, Alcian Blue, Alizarin Red, Aniline blue, Aniline Blue diammonium salt, Auramine O Dye, Azure, Azure A chloride, Azure B, Basic Fuchsin, Bismarck Brown Y, Brilliant Cresyl Blue, Brilliant Green, Carmine, Congo Red, Cresyl Violet acetate, Crystal Violet, Darrow Red, Eosin, Eosin B, Eosin Y, Eosin Y disodium salt, Erythrosin B, Erythrosin extra bluish, Ethyl eosin, Fast Green FCF, Hematoxylin, Indigo carmine, Janus Green B, Light Green SF Yellowish, Malachite Green oxalate salt, Methyl Blue, Methyl green, Methyl Green zinc chloride, Methyl Orange, Methyl violet 2B, Methylene blue, Methylene Violet (Bernthsen), Neutral Red, Nigrosin, Nile Blue A, Oil Red O, Orange G, Orange II sodium salt, Orcein synthetic, Phloxine B Dye, Pyronin B, pyronin G, Pyronin Y, Resazurin sodium salt, Rose Bengal sodium salt, Safranin O, Sudan Black B, Sudan III, Sudan IV, Thionin acetate salt, toluidine, Toluidine Blue O, and the like.

Histological stains include Romanowsky stains. Romanowsky stains are generally neutral stains composed of various components including but not limited to methylene blue (e.g., Azure B) and eosin (e.g., Eosin Y) dyes. Azures are basic dyes that bind acid nuclei and result in a blue to purple color. Eosin is an acid dye that is attracted to the alkaline cytoplasm producing red coloration. Romanowsky stains vary and include various formulations including those containing various azure and eosin analogs. Romanowsky stains and their mechanisms of staining are well-known and described in e.g., Horobin & Walter. Histochemistry (1987) 86:331-336; Marshall et al. *J Clin Pathol* (1978) 31(3):280-2; Marshall et al. *J Clin Pathol*. (1975) 28(11):920-3; *J Clin Pathol* (1975) 28(8):680-5; the disclosures of which are incorporated herein by reference.

Romanowsky stains include but are not limited to Giemsa Stain, Wright Stain, Wright Giemsa Stain, Jenner Stain, Jenner-Giemsa Stain, Leishman Stain, May Grunwald Stain, May Grunwals Giemsa Stain, and the like. Each Romanowsky stain may exist in various formulations either as derived from various different recipes or as supplied from various providers. Romanowsky stain formulations may include various stain components including but not limited to e.g., methylene blue, azure A, azure B, azure C, toluidine blue, thionine, methylene violet Bernthsen, methyl thionoline, thionoline, eosin, eosin Y, tribromofluorescein, fluorescein, thiazine dyes, and the like. Romanowsky stain formulations may include various solvents to dissolve stain components including aqueous and organic solvents including but not limited to e.g., water and alcohols including but not limited to e.g., methanol, ethanol, isopropyl alcohol, etc.

The histological stains and components thereof include those commercially available from such suppliers including not limited to e.g., Sigma Aldrich, Thermo Fisher Scientific, Avantor Proformance Materials, VWR International, Polysciences Inc., and the like.

The present methods may also include, in some instances, adjustments based on the assessed bath volume and/or adjustments based on the counted slide number, which influence the liquid bath level. In some instances, the methods include adjustments based on the assessed staining bath volume and/or adjustments based on the counted slide number, which influence the liquid level of the staining bath. As such, adjustments of the instant methods include increasing bath volume and decreasing bath volume of various baths, including e.g., staining baths. In methods involving automated systems, adjustment of liquid levels may include the result of the assessment automatically triggering the adjustment, e.g., through the triggered action of one or more valves that result in the filling, draining, etc., of a reagent bath.

As noted above, adjustments of the instant disclosure may be adjustments based on multiple assessments. For example, in some instances, adjustments may be based on the assessed bath volume, the counted slide number, reagent quality and combinations thereof. Assessments on which adjustments are based may be performed before, during or after slides are inserted into the reagent bath on which the adjustment is performed. Similarly, the adjustment identified as necessary or triggered by the assessment may be performed before, during or after the slides are inserted into the subject reagent bath.

Methods of the present disclosure may provide for fine control of liquid level in one or more reagent baths and/or complete replacement of the liquid in a subject bath in an automated slide preparation system. As such, the liquid volume of adjustments of the subject methods may range from less than 1 ml to 1 L or more including but not limited to e.g., from 1 ml to 1 L, from 2 ml to 1 L, from 3 ml to 1 L, from 4 ml to 1 L, from 5 ml to 1 L, from 6 ml to 1 L, from 7 ml to 1 L, from 8 ml to 1 L, from 9 ml to 1 L, from 10 ml to 1 L, from 11 ml to 1 L, from 12 ml to 1 L, from 13 ml to 1 L, from 14 ml to 1 L, from 15 ml to 1 L, from 16 ml to 1 L, from 17 ml to 1 L, from 18 ml to 1 L, from 19 ml to 1 L, from 20 ml to 1 L, from 21 ml to 1 L, from 22 ml to 1 L, from 23 ml to 1 L, from 24 ml to 1 L, from 25 ml to 1 L, from 30 ml to 1 L, from 35 ml to 1 L, from 40 ml to 1 L, from 45 ml to 1 L, from 50 ml to 1 L, from 55 ml to 1 L, from 60 ml to 1 L, from 65 ml to 1 L, from 70 ml to 1 L, from 75 ml to 1 L, from 80 ml to 1 L, from 85 ml to 1 L, from 90 ml to 1 L, from 95 ml to 1 L, from 100 ml to 1 L, from 150 ml to 1 L, from 200 ml to 1 L, from 250 ml to 1 L, from 300 ml to 1 L, from 350 ml to 1 L, from 400 ml to 1 L, from 450 ml to 1 L, from 500 ml to 1 L, from 600 ml to 1 L, from 700 ml to 1 L, from 800 ml to 1 L, from 900 ml to 1 L, from 1 ml to 500 ml, from 2 ml to 500 ml, from 3 ml to 500 ml, from 4 ml to 500 ml, from 5 ml to 500 ml, from 6 ml to 500 ml, from 7 ml to 500 ml, from 8 ml to 500 ml, from 9 ml to 500 ml, from 10 ml to 500 ml, from 11 ml to 500 ml, from 12 ml to 500 ml, from 13 ml to 500 ml, from 14 ml to 500 ml, from 15 ml to 500 ml, from 16 ml to 500 ml, from 17 ml to 500 ml, from 18 ml to 500 ml, from 19 ml to 500 ml, from 20 ml to 500 ml, from 21 ml to 500 ml, from 22 ml to 500 ml, from 23 ml to 500 ml, from 24 ml to 500 ml, from 25 ml to 500 ml, from 30 ml to 500 ml, from 35 ml to 500 ml, from 40 ml to 500 ml, from 45 ml to 500 ml, from 50 ml to 500 ml, from 55 ml to 500 ml, from 60 ml to 500 ml, from 65 ml to 500 ml, from 70 ml to 500 ml, from 75 ml to 500 ml, from 80 ml to 500 ml, from 85 ml to 500 ml, from 90 ml to 500 ml, from 95 ml to 500 ml, from 100 ml to 500 ml, from 150 ml to 500 ml, from 200 ml to 500 ml, from 250 ml to 500 ml, from 300 ml to 500 ml, from 350 ml to 500 ml, from 400 ml to 500 ml, from 450 ml to 500 ml, from 1 ml to 250 ml, from 2 ml to 250 ml, from 3 ml to 250 ml, from 4 ml to 250 ml, from 5 ml to 250 ml, from 6 ml to 250 ml, from 7 ml to 250 ml, from 8 ml to 250 ml, from 9 ml to 250 ml, from 10 ml to 250 ml, from 11 ml to 250 ml, from 12 ml to 250 ml, from 13 ml to 250 ml, from 14 ml to 250 ml, from 15 ml to 250 ml, from 16 ml to 250 ml, from 17 ml to 250 ml, from 18 ml to 250 ml, from 19 ml to 250 ml, from 20 ml to 250 ml, from 21 ml to 250 ml, from 22 ml to 250 ml, from 23 ml to 250 ml, from 24 ml to 250 ml, from 25 ml to 250 ml, from 30 ml to 250 ml, from 35 ml to 250 ml, from 40 ml to 250 ml, from 45 ml to 250 ml, from 50 ml to 250 ml, from 55 ml to 250 ml, from 60 ml to 250 ml, from 65 ml to 250 ml, from 70 ml to 250 ml, from 75 ml to 250 ml, from 80 ml to 250 ml, from 85 ml to 250 ml, from 90 ml to 250 ml, from 95 ml to 250 ml, from 100 ml to 250 ml, from 150 ml to 250 ml, from 200 ml to 250 ml, etc.

Correspondingly, liquid level adjustments of the present methods will vary, e.g., depending on the type of adjustment indicated and the dimensions of the bath, and may range from 0.1 mm to 10 mm or more including but not limited to e.g., 0.1 mm to 10 mm, 0.2 mm to 10 mm, 0.3 mm to 10 mm, 0.4 mm to 10 mm, 0.5 mm to 10 mm, 0.6 mm to 10 mm, 0.7 mm to 10 mm, 0.8 mm to 10 mm, 0.9 mm to 10 mm, 1 mm to 10 mm, 1.5 mm to 10 mm, 2 mm to 10 mm, 2.5 mm to 10 mm, 3 mm to 10 mm, 3.5 mm to 10 mm, 4 mm to 10 mm, 4.5 mm to 10 mm, 5 mm to 10 mm, 5.5 mm to 10 mm, 6 mm to 10 mm, 6.5 mm to 10 mm, 7 mm to 10 mm, 7.5 mm to 10 mm, 8 mm to 10 mm, 8.5 mm to 10 mm, 9 mm to 10 mm, 9.5 mm to 10 mm, 0.1 mm to 5 mm, 0.2 mm to 5 mm, 0.3 mm to 5 mm, 0.4 mm to 5 mm, 0.5 mm to 5 mm, 0.6 mm to 5 mm, 0.7 mm to 5 mm, 0.8 mm to 5 mm, 0.9 mm to 5 mm, 1 mm to 5 mm, 1.5 mm to 5 mm, 2 mm to 5 mm, 2.5 mm to 5 mm, 3 mm to 5 mm, 3.5 mm to 5 mm, 4 mm to 5 mm, 4.5 mm to 5 mm, 1.5 mm to 7.5 mm, 2 mm to 7 mm, 2.5 mm to 6.5 mm, 3 mm to 6 mm, 3.5 mm to 5.5 mm, 4 mm to 5 mm, and the like.

In some instances, a liquid level adjustment may be based on the number of slides detected in a slide counting assessment where the displacement of each slide is known, as calculated based on known slide dimensions, including e.g., those slide dimensions of commercially available slides including but not limited to e.g., those described herein. In some instances, liquid level adjustments of the subject methods are performed based on one or more assessments described above to achieve a desired liquid level, where desired liquid levels may vary and may include e.g., the liquid level determined for a bath such that the liquid sufficiently covers the specimen area of the slide without contacting the specimen information area. In some instances, liquid level adjustments of the subject methods are performed based on one or more assessments described above to achieve a predetermined liquid level, where the predetermined liquid level may vary and may include e.g., the liquid level determined for a particular bath slide combination such that the liquid sufficiently covers the specimen area of the slide without contacting the specimen information area.

Adjustments of the present methods include adjusting a stain bath based on assessment of stain quality, e.g., as described herein. Stain quality assessments that would indicate and/or trigger an adjustment include but are not limited to e.g., an assessment of a stain above or below a quality threshold (e.g., below a stain intensity threshold, above a stain variability threshold, below a stain transparency threshold, etc.) an assessment of a stain indicating a level of debris above a predetermined threshold, an assessment indicating a level of streaks above a predetermined threshold, etc. Adjustments, e.g., as based on one or more the assessments as described herein, of the present methods may be achieved, among other means, through use of one or more devices or integrated systems described below.

In addition to or in place of the reagent adjustments, assessments described herein may indicate the necessity to alter physical manipulations performed during the slide preparation procedure. For example, an assessment indicating a lack of stain quality may indicate a need to increase or decrease an incubation time within a particular stain. As another example, the presence of streaks identified based on an assessment as described herein may indicate that a change in the speed of a processing step may be required, e.g., the speed at which slides are inserted or removed from one or more reagent baths may be increased or decreased. Such adjustments to the physical manipulations of the slide processing procedure that may be indicated based on one or more assessments described herein may be manually or automatically implemented, including e.g., automatically implemented in one or more of the herein described devices and systems.

Devices and Systems

As summarized above, the present disclosure provides devices and systems for use in the automated assessment and control of aspects of slide preparation in an automated histology or hematology instrument. Devices and systems of the present disclosure may perform all or a portion of an automated assessment of reagent amounts and/or an automated assessment of reagent performance. The subject devices and systems may also perform one or more adjustments, e.g., of a slide staining reagent or the slide staining process, based on one or more the assessments described herein including e.g., adjustments of reagent amounts, e.g., as present in reagent baths, adjustments of reagent compositions, replacement of reagents, etc.

Devices and systems of the present disclosure may include one or more microscope slides. Slides that may be utilized in the subject devices and systems include specimen slides and non-specimen slides (i.e., blank slides). Blank slides may be utilized in the subject devices and systems in various ways. For example, in some instances, a blank slide may be loaded into a slide carrier and stained in parallel or in series with one or more specimen slides, e.g., for use in assessing the quality of a slide staining reagent used in preparation of slides for hematological analysis. In some instances, unstained blank slides may be utilized in the subject devices or systems, e.g., as a reference or control to which a stained blank slide is compared.

Slide (i.e., microscope slide) shapes and dimensions, although readily available, may vary and, as such the analysis surface, also referred to as the "microscope plane", of a slide may be essentially square, essentially rectangular, etc. Slides are commonly available with microscope plane dimensions including but not limited to e.g., 25 mm×25 mm, 25 mm×75 mm, 25 mm×76 mm, 26 mm×75 mm, 26 mm×76 mm, 27 mm×46 mm, 28 mm×48 mm, 38 mm×75 mm, 50 mm×75 mm, 51 mm×75 mm, 51 mm×76 mm, 52 mm×76 mm, 76 mm×102 mm, 83 mm×102 mm, 102 mm×127 mm, 114 mm×152 mm, 127 mm×178 mm, and the like. Rectangular slides may be referred to as having a long axis and a short axis, where such axes are defined relative to the microscope plane of the slide. Slide thickness will vary and may range from 0.5 mm or less to 2 mm or more including but not limited to e.g., 0.5 mm thick, 1 mm thick, 1.2 mm thick, 1.4 mm thick, 1.6 mm thick, etc. Slides may or may not have a "frosted area", where a frosted area generally refers to any area of the slide configured for adding (writing, printing, etching, adhering, etc.) information (e.g., specimen information, patient information, assay information, date, time, etc.) to the slide, whether or not the area is actually "frosted". Slides will generally be constructed of glass but may also, in some instances, be constructed of various polymers including but not limited to plastics (e.g., polystyrene, acrylic, and the like).

Devices and systems of the present disclosure may include a slide carrier having one or more slots dimensioned to hold a slide. Such devices will generally include one or more slots or contact points capable of holding a slide during transport through one or more areas of an automated slide preparation device.

The slide holding capacity of slide carriers will vary depending on the particular configuration, e.g., a slide carrier have a capacity of one slide to 20 or more, including but not limited to e.g., from one to 20 slides, from one to 19 slides, from one to 18 slides, from one to 17 slides, from one to 16 slides, from one to 15 slides, from one to 14 slides, from one to 13 slides, from one to 12 slides, from one to 11 slides, from one to 10 slides, from one to 9 slides, from one to 8 slides, from one to 7 slides, from one to 6 slides, from one to 5 slides, from one to 4 slides, from one to 3 slides, one or 2 slides, from 2 to 20 slides, from 2 to 19 slides, from 2 to 18 slides, from 2 to 17 slides, from 2 to 16 slides, from 2 to 15 slides, from 2 to 14 slides, from 2 to 13 slides, from 2 to 12 slides, from 2 to 11 slides, from 2 to 10 slides, from 2 to 9 slides, from 2 to 8 slides, from 2 to 7 slides, from 2 to 6 slides, from 2 to 5 slides, from 2 to 4 slides, 2 or 3 slides, from 5 to 20 slides, from 5 to 19 slides, from 5 to 18 slides, from 5 to 17 slides, from 5 to 16 slides, from 5 to 15 slides, from 5 to 14 slides, from 5 to 13 slides, from 5 to 12 slides, from 5 to 11 slides, from 5 to 10 slides, from 5 to 9 slides, from 5 to 8 slides, from 5 to 7 slides, 5 or 6 slides, from 10 to 20 slides, from 10 to 19 slides, from 10 to 18 slides, from 10 to 17 slides, from 10 to 16 slides, from 10 to 15 slides, from 10 to 14 slides, from 10 to 13 slides, from 10 to 12 slides, 10 or 11 slides, etc.

In some instances, slide carriers of the instant methods may hold one or more slides in a vertical orientation for insertion into a reagent bath. The slide carrier may or may not maintain contact with the slide(s) after insertion into the bath, e.g., releasing the slides during incubation and reestablishing contact upon removing the slides from the bath. An ordinary skilled artisan will readily understand that apparatus for holding a slide in a slide carrier and/or bath may vary and are not limited to slots and may include e.g., any contact point or clamp or other mechanism capable of holding the slide in a desired orientation, such as e.g., vertical.

Devices and systems of the present disclosure may include one or more reagent baths. Reagent baths of the subject devices and systems may be used in various process of slide preparation including but not limited to e.g., the fixation, incubating, blocking, staining, hybridization, washing, de-staining, stripping, post-fixing, labeling, etc., that a slide may be subjected to in any staining protocol including e.g., histological staining protocols, hematological staining protocols, immunological staining protocols, DNA/RNA hybridization protocols, and the like. As such, reagent bath sizes and configurations will vary greatly and the subject baths may be referred to as a fixation bath, an incubation bath, a blocking bath, a staining bath, a hybridization bath, a wash bath, a de-staining bath, a stripping bath, a post-fix bath, a labeling bath, etc.

Reagent baths will generally be designed to have an liquid capacity that exceeds the volume of liquid commonly employed in the bath where, for example, a reagent bath may have an liquid capacity that is 50% greater than the volume of liquid employed in the bath or less including but not limited to e.g., between 5% to 50% greater, between 10% to 50% greater, between 15% to 50% greater, between 20% to 50% greater, between 25% to 50% greater, between 30% to 50% greater, between 35% to 50% greater, between 40% to 50% greater, between 5% to 40% greater, between 5% to 35% greater, between 5% to 30% greater, between 5% to 25% greater, between 5% to 20% greater, between 5% to 15% greater, between 5% to 10% greater, between 10% to 40% greater, between 15% to 35% greater, between 20% to 30% greater, etc.

In some instances, the volume capacity of a reagent bath of the subject method will range from less than 10 cc to 500 cc or more including but not limited to e.g., from 10 cc to 500 cc, from 20 cc to 500 cc, from 30 cc to 500 cc, from 40 cc to 500 cc, from 50 cc to 500 cc, from 60 cc to 500 cc, from 70 cc to 500 cc, from 80 cc to 500 cc, from 90 cc to 500 cc, from 100 cc to 500 cc, from 110 cc to 500 cc, from 120 cc to 500 cc, from 130 cc to 500 cc, from 140 cc to 500 cc, from 150 cc to 500 cc, from 160 cc to 500 cc, from 170 cc to 500 cc, from 180 cc to 500 cc, from 190 cc to 500 cc, from 200 cc to 500 cc, from 210 cc to 500 cc, from 220 cc to 500 cc, from 230 cc to 500 cc, from 240 cc to 500 cc, from 250 cc to 500 cc, from 50 cc to 450 cc, from 50 cc to 400 cc, from 50 cc to 350 cc, from 50 cc to 300 cc, from 50 cc to 250 cc, from 50 cc to 200 cc, from 50 cc to 150 cc, from 50 cc to 100 cc, from 100 cc to 450 cc, from 100 cc to 400 cc, from 100 cc to 350 cc, from 100 cc to 300 cc, from 100 cc to 250 cc, from 100 cc to 200 cc, from 100 cc to 150 cc, from 10 cc to 250 cc, from 20 cc to 250 cc, from 30 cc to 250 cc, from 40 cc to 250 cc, from 50 cc to 250 cc, from 60 cc to 250 cc, from 70 cc to 250 cc, from 80 cc to 250 cc, from 90 cc to 250 cc, from 100 cc to 250 cc, from 110 cc to 250 cc, from 120 cc to 250 cc, from 130 cc to 250 cc, from 140 cc to 250 cc, from 150 cc to 250 cc, from 160 cc to 250 cc, from 170 cc to 250 cc, from 180 cc to 250 cc, from 190 cc to 250 cc, from 200 cc to 250 cc, etc.

Devices and systems of the present disclosure may include one or more emitter-detector pairs where essentially any emitter-detector pair capable of achieving the detection processes of the above described methods may be employed. In some instances, the emitter and detector of a subject emitter-detector pair may be an optical emitter and an optical detector and such components may define an optical path of the device and/or system.

Optical emitters will generally produce an electromagnetic signal detectable by an optical detector which may include e.g., infrared light, visible light, ultraviolet light, and the like. In some instances, useful optical emitters may include an incandescent emitter, a fluorescent emitter, a light emitting diode (LED), a laser, etc. Useful optical detectors, also referred to as optical sensors, include any detector capable of detecting the signal produced from a corresponding sensor or a change in the signal produced from a corresponding sensor and converting the signal or the change in signal into an electronic signal. Useful optical sensors include but are not limited to e.g., photoresistors, photovoltaics, photodiodes, phototransistors, and the like. Optical sensors useful in the instant methods may include digital or analog sensors.

Emitter-detector pairs may be positioned within the subject devices and systems in any useful configuration establishing an optical path that may be completely or partially interrupted by another component. For example, emitter-detector pairs may be positioned establishing an optical path that is interrupted by one or more slides being carried by a slide carrier, one or more slides inserted into a reagent bath, a float attached to or contained within a level tube, etc. Depending on the context, emitters and detectors of the subject devices and systems may or may not include additional corresponding optical components for shaping, directing or otherwise controlling the optical path emitted or received. Useful addition optical components may include but are not limited to e.g., optical apertures, optical mirrors, optical lenses, optical filters, etc.

Components of the subject devices and systems may be connected to or otherwise in communication with one or more processors. As described in more detail below, substantially any circuitry can be configured to a functional arrangement within the devices and systems allowing for connectivity between components and to one or more processors for performing the methods disclosed herein.

In some instances, the devices and systems as described herein further include a component or system for indicating the result of an assessment as described herein where the component or system may be configured to report the result of an assessment in any convenient and appropriate manner. Such components or systems will vary depending on the particular configuration of the device and or system and may include but are not limited to e.g., an alarm, an indicator light, a display (e.g., a computer monitor, a graphical user interface (GUI), etc.), a printer configured to print, e.g., onto tangible media (including e.g., paper or tape), and the like. In some instances, the component or system indicates, e.g., sounds, lights up, or otherwise displays, to a user whether an adjustment of one or more reagent baths is necessary. In some instances, the component or system indicates, e.g., sounds, lights up, or otherwise displays, to a user whether a subject stain does or does not exceed a predetermined quality threshold.

In some instances, whether or not the device or system includes a mechanism to report the result of an assessment to a user, the device or system may include connections or otherwise be capable of propagating the result of the assessment to other components of the device or system, e.g., to trigger the device or system to make an adjustment based on the assessment.

In some instances, the device or system may include one or more components configured to add or remove liquid reagents from one or more reagent baths based on the result of one or more assessments as described herein. In some instances, such components include but are not limited to valves. Such valves, one or more of which may be used in the subject devices and systems, may be linked to or otherwise in communication with a processor allowing control of the one or more valves based on the result of one or more of the assessments described herein. Any convenient and appropriate valves may find use in the subject systems and devices including but not limited to e.g., angle valves, air-operated valves, ball valves, butterfly valves, check valves, cylinder valves, diaphragm valves, gate valves, globe valves, plug valves, rotary valves, stop check valves, and the like. In some instances, valves of the subject devices and systems may be electrically actuated valves including electrically actuated versions of one or more of the valves described herein.

As will be readily understood, in some instances, a pump may be substituted for or used in combination with a valve, e.g., where liquid is to be transported to or from a reagent bath. Useful pumps include but are not limited to e.g., positive displacement pumps (e.g., gear pumps, screw pumps, progressing cavity pumps, roots-type pumps, peristaltic pumps, plunger pumps, double-diaphragm pumps, rope pumps, etc.), impulse pumps, velocity pumps, gravity pumps, etc. Electrically controlled pumps, in some instances, may be substituted for the electrically controlled valves described herein.

In some instances, an electrically controlled valve of the subject devices and systems may be communication with one or more processors such that the result of an assessment described herein triggers the electrically controlled valve to add a reagent to the reagent bath. As such, the systems and devices of the present disclosure may include one or more fill valves in communication with a processor that, when activated, cause an increase in the liquid level of a reagent bath. The fill valve may increase the liquid level, e.g., incrementally or continuously, including where the liquid level is increased to a desired or predetermined liquid level by activating and deactivating the valve.

Fill valves may be attached to one or more reservoirs containing the reagent to be added to the reagent bath. Reservoirs to which a fill valve may be attached include essentially any component or components of any slide preparation reagent including but not limited to e.g., one or more of the slide preparation components described herein. Useful reservoirs in the systems and devices described herein include but are not limited to e.g., stain reservoirs, stain component reservoirs, fixation reagent reservoirs, wash reservoirs, buffer reservoirs, water reservoirs, and the like. In some instances, the flow of a reagent from a reservoir through a fill valve may be operated at least in part by gravity. In some instances, the flow of a reagent from a reservoir through a fill valve may be operated at least in part by non-gravity produced pressure, including e.g., pressure produced by a pump operably connected to the fill valve.

In some instances, an electrically controlled valve of the subject devices and systems may be in communication with one or more processors such that the result of an assessment described herein triggers the electrically controlled valve to decrease the volume of the reagent in the reagent bath. As such, the systems and devices of the present disclosure may include one or more drain valves in communication with a processor that, when activated, cause a decrease in the liquid level of a reagent bath. The drain valve may decrease the liquid level, e.g., incrementally or continuously, including where the liquid level is decreased to a desired or predetermined liquid level by activating and deactivating the valve.

Drain valves may be, in some instances, attached to a waste container. In some instances, the flow of reagent from a reagent bath through a drain valve, e.g., into a waste container, may be operated at least in part by gravity. In some instances, the flow of reagent from a reagent bath through a drain valve, e.g., into a waste container, may be operated at least in part by non-gravity produced pressure, including e.g., pressure produced by a pump operably connected to the drain valve.

Devices and systems of the present disclosure may include one or more automated volume indicators for assessing the volume and/or liquid level of a reagent bath. Automated volume indicators will generally include a level tube connected to the reagent bath. The level tube may be connected to the bottom of the reagent bath, the side of the reagent bath, and the like. The level tube may or may not be connected with an intervening connector between the level tube and the bath such as, e.g., a tube or reservoir. In some instances, the level tube may include a float and an emitter-detector pair positioned such that, when the reagent bath is filled or drained, raising or lowering the liquid level of the reagent bath, the float moves within the path of the emitter-detector pair. Such floats, when used in combination with an optical emitter-detector pair, will generally be at least semitransparent, if not nearly or completely opaque. As described above, in some instances, the individual components of an optical emitter-detector pair used in an automated volume indicator may include one or more apertures.

Automated volume indicators of the subject disclosure will generally include one or more connections, wired or wireless, between the detector of an emitter-detector pair for transmitting the result of an volume assessment as described in the subject methods. Automated volume indicators, when transmitting a result indicating that an adjustment of liquid volume or level is required, may trigger the opening and/or closing of one or more valves based on the necessary adjustment.

Devices and systems of the present disclosure may include one or more automated slide counters for performing an automated count of slides, e.g., as present in a slide carrier, reagent bath or a combination thereof. Automated slide counters will generally include an emitter-detector pair positioned such that the optical path defined by the emitter-detector pair passes through the slides at some point during traverse of the slides through the slide preparation process. Accordingly, the emitter-detector pair may be positioned at various points along the path of the slides within an automated slide preparation instrument including but not limited to e.g., a positon prior to one or more reagent baths, a position associated with a reagent bath, a position following one or more reagent baths, etc.

Automated slide counters of the subject disclosure will generally include one or more connections, wired or wireless, between the detector of an emitter-detector pair for transmitting the result of an slide number assessment as described in the subject methods. Automated slide counters, when transmitting a result indicating that the number of slides identified requires an adjustment of liquid volume or level, may trigger the opening and/or closing of one or more valves based on the necessary adjustment.

Devices and systems of the present disclosure may include one or more volume controlled slide staining systems for controlling the volume and/or liquid level of one or more reagent baths in an automated slide preparation device. Volume controlled slide staining systems of the subject disclosure will generally include one or more automated volume indicators integrated with one or more automated slide counters for performing integrated assessments of the volume and/or liquid level of reagent baths utilized in automated slide staining procedures. The individual components of a volume controlled slide staining system may share a processor or include one or more designated processors for one or more components of the system. Whether a single or multiple processors are employed the subject system may integrate the individual assessments of the components of the system into a simple set of commands or a single command, e.g., triggering an adjustment of a reagent bath where required, e.g., through the control or one or more valves as described herein.

In some instances, a volume controlled slide staining system may constantly monitor the volume and/or liquid level of one or more reagent baths of a slide staining system. In some instances, a volume controlled slide staining system may periodically assess the volume and/or liquid level of one or more reagent baths of a slide staining system. Such periodic assessments may be performed by the device or system at regular time intervals or at event-associated interval including e.g., once or more per slide preparation run or batch, once or more prior to slides being inserted into a particular reagent bath (e.g., a staining bath), etc.

Devices and systems of the present disclosure may include one or more reagent assessment systems for assessing the quality and/or performance of a reagent utilized in an automated slide preparation system. In some instances, such devices and systems may assess the quality and/or performance of a stain utilized in an automated histological slide preparation system. A subject reagent assessment system will generally include a slide imaging device, including e.g., one or more of the digital microscopy devices described above. The devices and systems of the subject disclosure may include a single imaging device utilized to image both specimen slides as well as blank slides, including e.g., stained blank slides or unstained slides. In some instances, a device or system may include a designated imaging device including but not limited to a designated specimen imaging device, a designated blank slide imaging device, including e.g., where such a device or system includes two or more designated imaging devices.

The imaging device(s) of an automated reagent assessment system will generally be in communication with a processor for performing one or more functions of making an assessment of the reagent, including but not limited to e.g., one or more of the functions or steps of described in the reagent assessment methods described above. A reagent assessment system may, in some instances, also include a computer memory attached to a shared or designated processor. An attached computer memory may store various data including but not limited to e.g., one or more reference parameter values and/or reference signatures. Stored reference values and/or signatures may be utilized in comparisons of acquired parameter values and/or acquired signatures to make a reagent assessment, e.g., as described in the methods above.

The processor of an automated reagent assessment system may be capable of performing various functions and/or triggering other components of the system to perform various functions, e.g., due to instructions stored thereon which may be executed by the processor. In some instances, the processor is capable of, and may include instructions for receiving images from an imaging device. In some instances, the processor is capable of, and may include instructions for processing images, e.g., through performing one or more image processing steps, including e.g., one or more of the image processing steps described above. In some instances, the processor is capable of, and may include instructions for extracting a parameter value from image data. In some instances, the processor is capable of, and may include instructions for producing a stain signature, e.g., as derived from two or more parameter values. In some instances, the processor is capable of, and may include instructions for storing and retrieving various data from memory, including but not limited to reference values and signatures, measured values and signatures, etc. In some instances, the processor is capable of, and may include instructions for making comparisons between data, including but not limited to e.g., comparisons between a reference parameter value and a measured parameter value, comparisons between a reference stain signature and a measured stain signature, etc.

In some instances, the components of the systems as described herein may be connected by a wired data connection. Any suitable and appropriate wired data connection may find use in connecting the components of the described systems, e.g., as described herein, including but not limited to e.g., commercially available cables such as a USB cable, a coaxial cable, a serial cable, a C2G or Cat2 cable, a Cat5/Cat5e/Cat6/Cat6a cable, a Token Ring Cable (Cat4), a VGA cable, a HDMI cable, a RCA cable, an optical fiber cable, and the like. In some instances, e.g., where data security is less of a concern, wireless data connections may be employed including but not limited to e.g., radio frequency connections (e.g., PAN/LAN/MAN/WAN wireless networking, UHF radio connections, etc.), an infrared data transmission connection, wireless optical data connections, and the like.

The devices and systems of the instant disclosure may further include a "memory" that is capable of storing information such that it is accessible and retrievable at a later date by a computer. Any convenient data storage structure may be chosen, based on the means used to access the stored information. In certain aspects, the information may be stored in a "permanent memory" (i.e. memory that is not erased by termination of the electrical supply to a computer or processor) or "non-permanent memory". Computer harddrive, CD-ROM, floppy disk, portable flash drive and DVD are all examples of permanent memory. Random Access Memory (RAM) is an example of non-permanent memory. A file in permanent memory may be editable and re-writable.

Substantially any circuitry can be configured to a functional arrangement within the devices and systems for performing the methods disclosed herein. The hardware architecture of such circuitry, including e.g., a specifically configured computer, is well known by a person skilled in the art, and can comprise hardware components including one or more processors (CPU), a random-access memory (RAM), a read-only memory (ROM), an internal or external data storage medium (e.g., hard disk drive). Such circuitry can also comprise one or more graphic boards for processing and outputting graphical information to display means. The above components can be suitably interconnected via a bus within the circuitry, e.g., inside a specific-use computer. The circuitry can further comprise suitable interfaces for communicating with general-purpose external components such as a monitor, keyboard, mouse, network, etc. In some embodiments, the circuitry can be capable of parallel processing or can be part of a network configured for parallel or distributive computing to increase the processing power for the present methods and programs. In some embodiments, the program code read out from the storage medium can be written into a memory provided in an expanded board inserted in the circuitry, or an expanded unit connected to the circuitry, and a CPU or the like provided in the expanded board or expanded unit can actually perform a part or all of the operations according to the instructions of the programming, so as to accomplish the functions described.

In addition to the components of the devices and systems of the instant disclosure, e.g., as described above, systems of the disclosure may include a number of additional components, such as data output devices, e.g., monitors and/or speakers, data input devices, e.g., interface ports, keyboards, etc., actuatable components, power sources, etc.

Computer Readable Media

The instant disclosure includes computer readable medium, including non-transitory computer readable medium, which stores instructions for methods described herein. Aspects of the instant disclosure include computer readable medium storing instructions that, when executed by a computing device, cause the computing device to perform one or more steps of a method as described herein. Aspects of the instant disclosure also include reference values and/or reference signatures that may be stored on computer readable medium and may be accessed by a computing device in performing one or more of the methods described herein.

In certain embodiments, instructions in accordance with the methods described herein can be coded onto a computer-readable medium in the form of "programming", where the term "computer readable medium" as used herein refers to any storage or transmission medium that participates in providing instructions and/or data to a computer for execution and/or processing. Examples of storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer.

The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

The following examples are offered by way of illustration and not by way of limitation.

EXAMPLES

Example 1

Characterization Parameters from a Stained Blank Slide

Blank slides, i.e., slides not containing a specimen, were processed for histological staining according to normal histological staining procedures used for specimen staining in an automated slide preparation device. The stained blank slides were then analyzed using a digital microscope. Multiple images were taken along various paths on the microscope surface of each slide. The images were processed using software to generate various parameters used in the analysis of slide staining quality.

Figure 11:
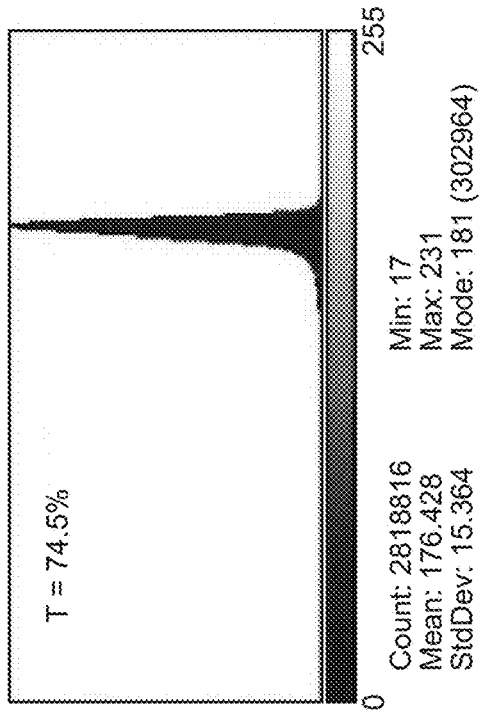
FIG. 11 provides an example of a histogram showing calculated parameters relative to stain quality obtained from a blank stained slide according to one embodiment of the present disclosure.
Figure 12:
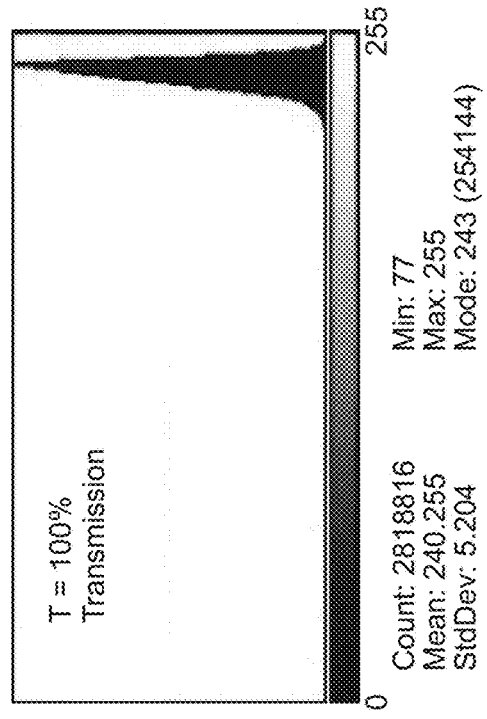
FIG. 12 provides an additional example of a histogram showing calculated parameters relative to stain quality obtained from a blank stained slide according to one embodiment of the present disclosure.
Figure 13:
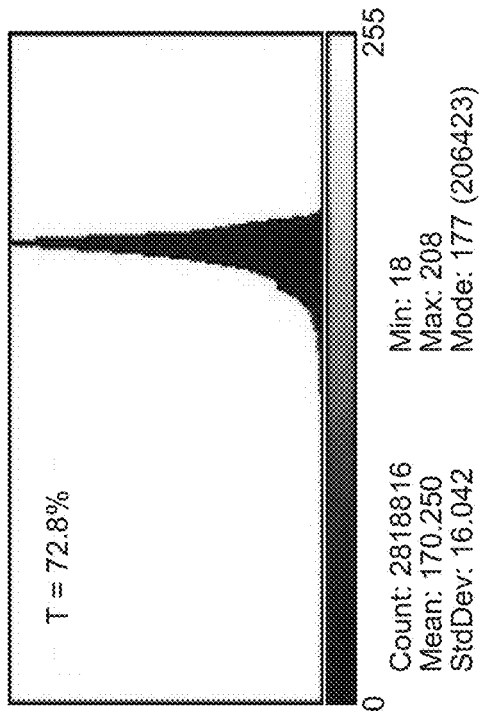
FIG. 13 provides an additional example of a histogram showing calculated parameters relative to stain quality obtained from a blank stained slide according to one embodiment of the present disclosure.
Figure 14:
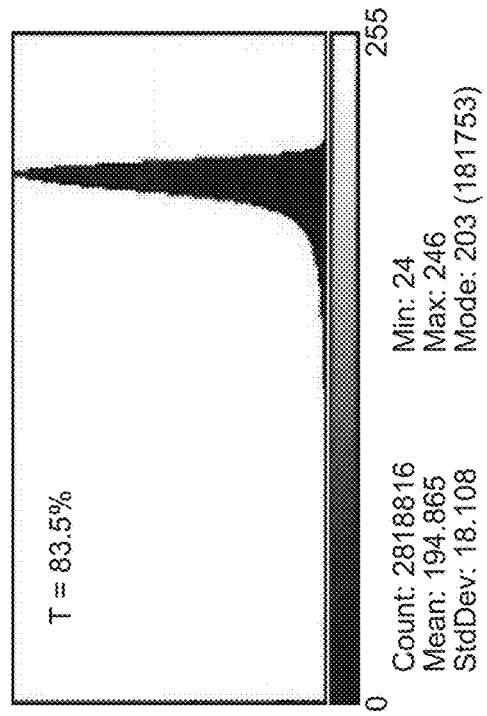
FIG. 14 provides an example of a histogram showing calculated parameters relative to stain quality obtained from an unstained blank slide according to one embodiment of the present disclosure.

Exemplary histograms obtained from three different stained blank slides (FIG. 11, FIG. 12 and FIG. 13) and one unstained slide (FIG. 14) are provided. Various statistical measures may be obtained, as depicted with the histograms, including e.g., mean intensity value (corresponding to a measure of staining intensity), standard deviation corresponding to a (measure of staining uniformity; e.g., more uniformly stained slides will generally have a lower standard deviation values), optical transmission ("T") (corresponding to a measure of relative transparency (reported as percent transmission) which may be determined relative to the baseline transmission measured for an unstained slide; e.g., darker stained slides will generally have lower values for optical transmission). These parameters may be assessed collectively for all channels in an acquired color (e.g., RBG) image or may be individually assessed for one or more particular color channels (R, B, G, or combinations thereof). In the instant example, the parameters obtained from the stained blank slides were compared to reference values of corresponding parameters obtained from an unstained blank slide.

Based on the results of the comparison and analysis of the parameters software controlling the automated slide staining instrument indicates the necessity for, or triggers, one or more adjustments of one or more reagent baths including e.g., emptying the bath(s), cleaning the bath(s), replacing one or more reagents, replenishing one or more reagents, etc.

Figure 15:
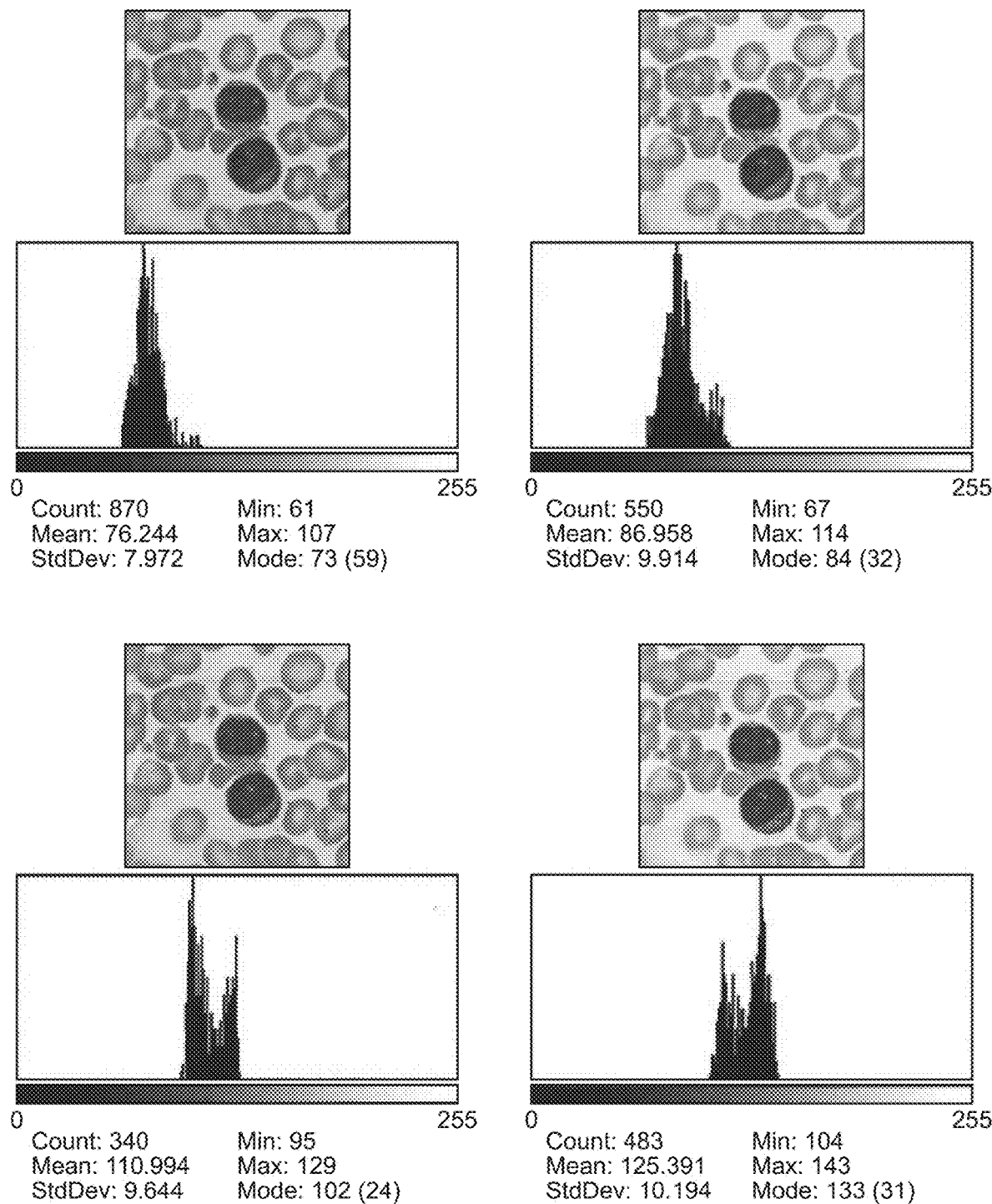
FIG. 15 demonstrates the influence of background staining on cell images, histograms and calculated image parameters as described herein.

As an example of the impact of background staining on the measured intensity of specimen staining the same stained cells of a specimen were imaged and analyzed before and after cleaning the bottom of the slide with methanol (see FIG. 15; on the left are the originally obtained images and histograms and on the right are the images and histograms obtained after cleaning the bottom of the slides with methanol). In histological staining procedures, the glass slide bearing the specimen is stained on both the surface containing the specimen and the non-specimen (i.e., "back" or "bottom") surface. Both of these surfaces contribute to the measured staining intensity in analyzed cells. This effect of background contribution to staining, which occurs whether the cell nuclei or cytoplasm is measured, is demonstrated in FIG. 15. The differences between the original and back-surface cleaned slides represent the contribution of the back-surface background to measured staining intensity of the representative cells. As demonstrated in this example, through successive rounds of staining, reagent baths or buffers may become contaminated with excess residual stain. Thus, at some point background staining, even on the back-surface of a slide, can impact the intensity of specimen staining.

Example 2

Identification of Streaks Using a Stained Blank Slide

Figure 16:
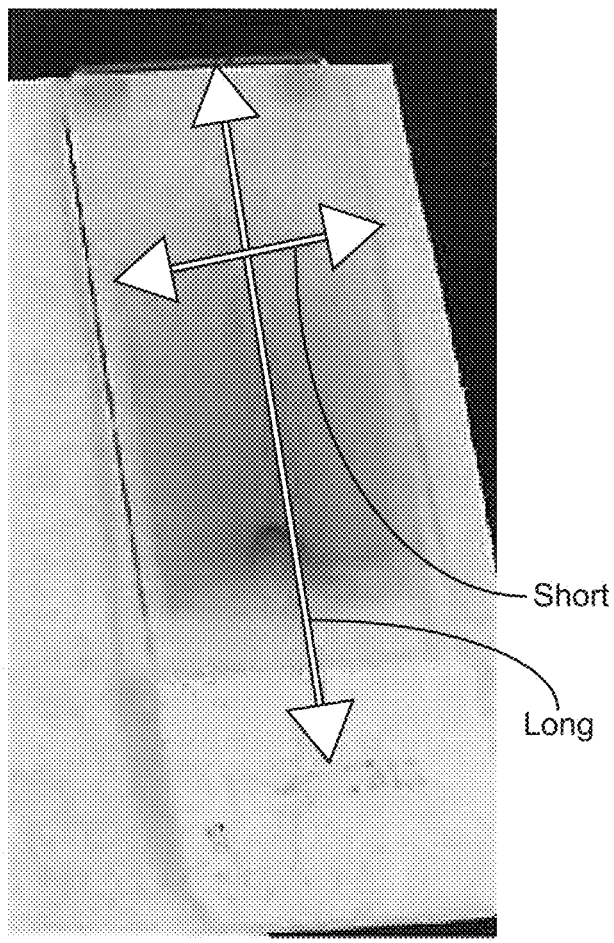
FIG. 16 depicts the long and short axes of a slide containing a stained smear.
Figure 17:
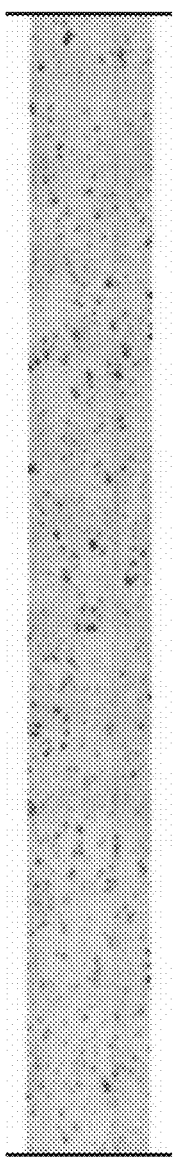
FIG. 17 depicts a stitched montage of images obtained along the long axis of the slide depicted in FIG. 16.
Figure 18:
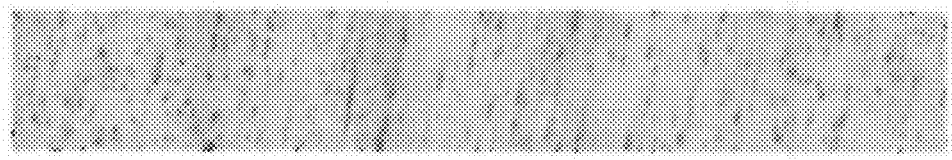
FIG. 18 depicts a stitched montage of images obtained along the short axis of the slide depicted in FIG. 16.

Blank slides, i.e., slides not containing a specimen, were processed for histological staining according to normal histological staining procedures in an automated slide preparation device. Images were collected along the long and short axes of the stained blank slides. An example of a stained blank slide with both the long axis ("long") and short axis ("short") identified is provided in FIG. 16. A plurality of images were taken along each of the long and short axes and stitched together into corresponding montages (see FIG. 17 and FIG. 18 for examples). Histograms were generated from the stitched montage images for each of the long and short axes and used to identify the presence of streaks.

Figure 19:
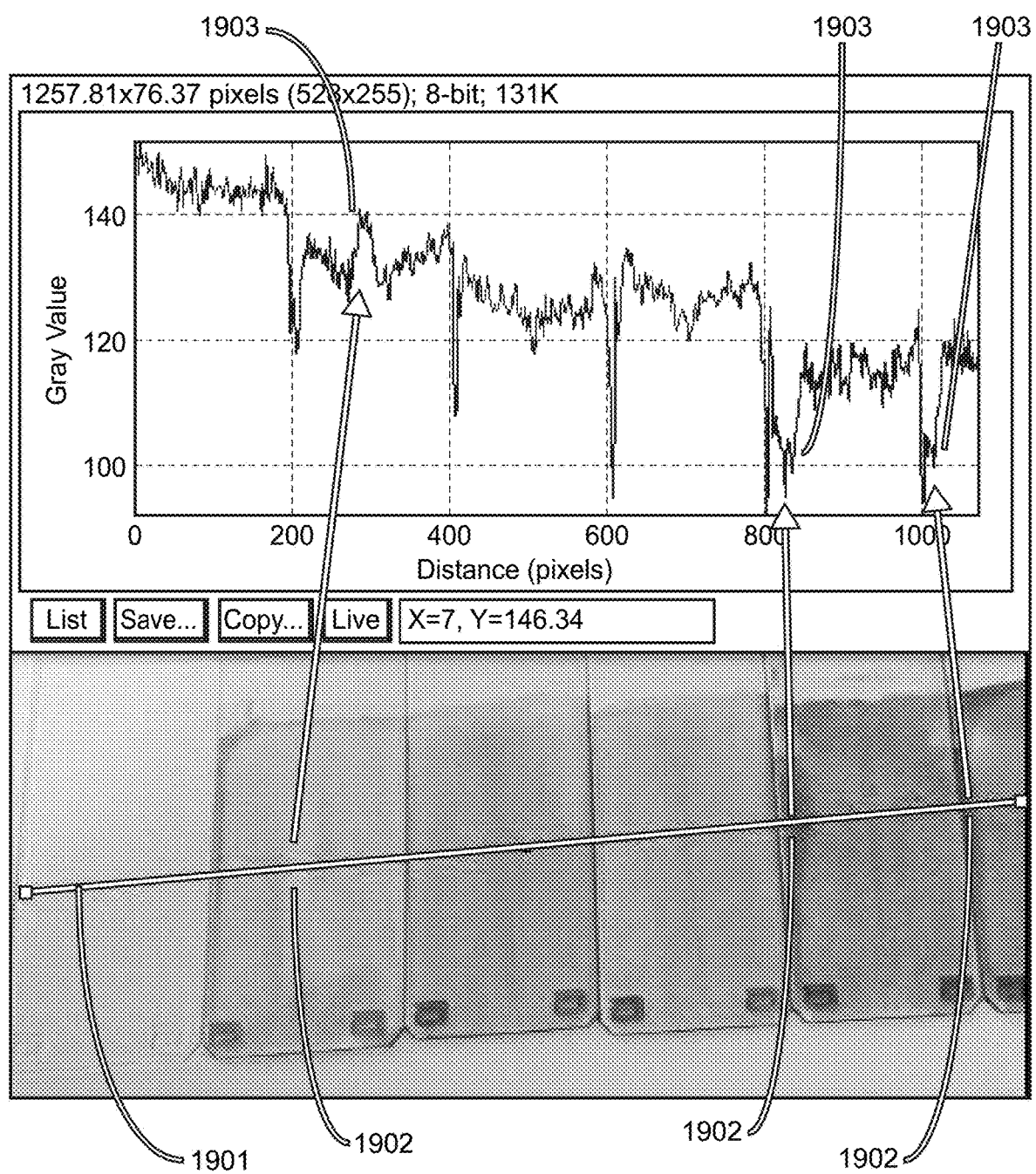
FIG. 19 depicts the use of intensity profiles of stained blank slides to detect localized defects in staining according to an embodiment of the present disclosure.

To further demonstrate the use of intensity plots to provide information about the uniformity of background staining and identify the presence of localized defects, such as streaks and smudges, stained blank slides were arranged side-by-side and intensity profiles were taken along the short axis of the slides (FIG. 19). The path (1901) along which the intensity profiles (1900) were taken is indicated in FIG. 19. Localized defects (1902) present on the slides appear as detectable variations (e.g., peaks) (1903) in the intensity profiles. Accordingly, this example demonstrates that by acquiring an image of a stained blank slide, processing and analyzing the image for variations in an image parameter (e.g., gray value or intensity) along an axis of the slide, localized defects in staining can be automatically identified and the uniformity of background staining may be assessed.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method of assessing a stain, the method comprising:
   simultaneously staining a plurality of slides in the stain wherein the plurality comprises at least one specimen slide and a blank slide;
   acquiring a digital color image of the stained blank slide using a specimen slide imaging device;
   processing the digital color image to produce a background stain signature comprising at least one staining parameter value; and
   comparing the background stain signature to a reference signature to assess the stain,
   wherein the reference signature is based on:
   1) a digital image of an unstained slide acquired using the specimen slide imaging device, and
   2) one or more parameter values obtained for a reference blank slide, the reference blank slide prepared using a stain of known quality.

2. The method according to claim 1, wherein the at least one staining parameter value comprises an overall staining intensity value.

3. The method according to claim 1, wherein the processing comprises separating the digital color image into individual color channels.

4. The method according to claim 3, wherein the at least one staining parameter value comprises a red staining intensity value.

5. The method according to claim 3, wherein the at least one staining parameter value comprises a green staining intensity value.

6. The method according to claim 3, wherein the at least one staining parameter value comprises a blue staining intensity value.

7. The method according to claim 3, wherein the acquiring comprises acquiring a plurality of digital color images of different areas of the stained blank slide and the processing comprises processing the plurality of digital color images to produce a background stain signature comprising at least one stain parameter value for each image of the plurality.

8. The method according to claim 7, wherein the at least one stain parameter value for each image of the plurality comprises an overall staining intensity value.

9. The method according to claim 8, wherein the staining parameter value comprises an overall staining uniformity value.

10. The method according to claim 7, wherein the processing comprises separating each image of the plurality into individual color channels.

11. The method according to claim 10, wherein the at least one staining parameter value for each image of the plurality comprises a red staining intensity value.

12. The method according to claim 11, wherein the staining parameter value comprises a red staining uniformity value.

13. The method according to claim 11, wherein the at least one staining parameter value for each image of the plurality comprises a green staining intensity value.

14. The method according to claim 13, wherein the staining parameter value comprises a green staining uniformity value.

15. The method according to claim 10, wherein the at least one staining parameter value for each image of the plurality comprises a blue staining intensity value.

16. The method according to claim 15, wherein the staining parameter value comprises a blue staining uniformity value.

17. The method according to claim 7, wherein the different areas of the stained blank slide are adjacent areas.

18. The method according to claim 7, wherein the different areas of the stained blank slide are nonadjacent areas.

19. The method according to claim 7, wherein the different areas of the stained blank slide are in a path along the middle of the slide.

20. The method according to claim 7, wherein the stained blank slide comprises a long axis and a short axis.

21. The method according to claim 20, wherein the different areas of the stained blank slide are in a path along the long axis of the slide.

22. The method according to claim 20, wherein the different areas of the stained blank slide are in a path along the short axis of the slide.

23. The method according to claim 20, wherein the different areas of the stained blank slide comprise a path along the short axis and a path along the long axis.

24. The method according to claim 1, wherein the reference signature is further based on a digital image, acquired using the specimen slide imaging device, of a blank slide stained with a stain of known quality.

25. The method according to claim 1, wherein the method assesses the quality of the stain.

26. The method according to claim 25, wherein the method further comprises outputting a result as to whether the stain quality is above a predetermined threshold.

27. The method according to claim 1, wherein the method assesses the presence of debris in the stain.

28. The method according to claim 1, wherein the method assesses whether the stain produces streaks.

29. A method of controlling stain quality, the method comprising:
assessing the quality of a stain according to claim 25;
outputting a result as to whether the stain quality is above a predetermined threshold; and
triggering an adjustment of the stain based on the result.

30. The method according to claim 29, wherein the adjustment comprises increasing an amount of the stain present in a staining bath.

31. The method according to claim 29, wherein the adjustment comprises supplementing the stain with one or more components of the stain.

32. The method according to claim 30, wherein the adjustment comprises emptying the stain bath and replacing the stain.

33. The method according to claim 32, wherein the emptying and replacing further comprises washing the stain bath.

* * * * *